United States Patent
Kano et al.

(10) Patent No.: US 6,680,817 B1
(45) Date of Patent: Jan. 20, 2004

(54) RECORDING MEDIUM DEVICE CONTAINING RECORDING MEDIUM AND RECORDING/REPRODUCING DEVICE

(75) Inventors: Yasuaki Kano, Kanagawa (JP); Kazuyuki Hirooka, Kanagawa (JP); Kazuya Koseki, Kanagawa (JP); Takao Hiramoto, Kanagawa (JP); Masahiro Kiyota, Tokyo (JP); Yoshihisa Takayama, Kanagawa (JP); Mitsunori Sakama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/554,803

(22) PCT Filed: Sep. 21, 1999

(86) PCT No.: PCT/JP99/05169

§ 371 (c)(1),
(2), (4) Date: Jul. 27, 2000

(87) PCT Pub. No.: WO00/17880

PCT Pub. Date: Mar. 30, 2000

(30) Foreign Application Priority Data

Sep. 21, 1998 (JP) .......................... P10-266588
Jan. 6, 1999 (JP) .......................... P11-001431

(51) Int. Cl.$^7$ .......................... G11B 23/023
(52) U.S. Cl. .......................... 360/132
(58) Field of Search .......................... 360/132, 133; 369/291

(56) References Cited

U.S. PATENT DOCUMENTS

| | | | | |
|---|---|---|---|---|
| 5,598,032 A | * | 1/1997 | Fidalgo | 235/492 |
| 5,612,532 A | * | 3/1997 | Iwasaki | 235/492 |
| 5,791,578 A | * | 8/1998 | Kurokawa et al. | 242/338.3 |
| 5,903,407 A | * | 5/1999 | Tsai | 360/132 |
| 5,929,414 A | * | 7/1999 | Saitoh | 235/380 |
| 6,081,857 A | * | 6/2000 | Frary | 369/30.3 |
| 6,100,788 A | * | 8/2000 | Frary | 340/10.1 |
| 6,304,416 B1 | * | 10/2001 | McAllister et al. | 360/132 |

FOREIGN PATENT DOCUMENTS

| | | | |
|---|---|---|---|
| EP | 0622794 | 11/1994 | G11B/15/07 |
| EP | 0841663 | 5/1998 | G11B/23/40 |
| EP | 0959472 | 11/1999 | G11B/23/087 |
| JP | 10149600 | 6/1998 | |
| JP | 10222957 | 8/1998 | |
| WO | 8910615 | 11/1989 | G11B/23/04 |
| WO | 9300680 | 1/1993 | G11B/23/30 |
| WO | 9402912 | 2/1994 | G06K/19/067 |
| WO | 9702565 | 1/1997 | G11B/23/30 |

* cited by examiner

*Primary Examiner*—Carl Whitehead, Jr.
*Assistant Examiner*—Jennifer M Dolan
(74) *Attorney, Agent, or Firm*—Jay H. Maioli

(57) ABSTRACT

A tape cartridge housing a magnetic tape includes an auxiliary storage medium having a storage unit in which to store the recording medium information such as design parameters or the number of times of recording and/or reproduction of the magnetic tape, and a transmission/reception unit for effecting inputting/outputting of the recording medium information with the recording and/or reproducing apparatus. The auxiliary storage medium is mounted so that the transmission/reception unit is exposed to the outside through an opening provided in a lateral surface of the main cartridge body unit not obstructing the loading of the magnetic tape, that is in a surface of the main cartridge body unit other than its front surface as an inserting end of the tape cartridge into the inside of the recording and/or reproducing apparatus. The auxiliary storage medium has an antenna constituting the transmission/reception unit for inputting/outputting the recording medium information with the recording and/or reproducing apparatus. It is through this antenna that the power is supplied from the auxiliary recording and/or reproducing unit provided on the recording and/or reproducing apparatus in accordance with a non-contact system transmitting the recording medium information and the power overlaid on the recording medium information.

4 Claims, 23 Drawing Sheets

RECORDING MEDIUM DEVICE CONTAINING RECORDING MEDIUM AND RECORDING/REPRODUCING DEVICE

TECHNICAL FIELD

This invention relates to a recording medium device having a disc-shaped recording medium, such as a tape-shaped recording medium, e.g., a magnetic tape, carrying information signals, or a disc-shaped recording medium, such as an optical disc or a magnetic disc, accommodated in a main cartridge body unit, and/or a recording and/or reproducing apparatus. More particularly, it relates to a recording medium device having an auxiliary recording member, memorizing the recording medium information concerning the recording medium housed in the main cartridge body unit, and a recording and/or reproducing apparatus employing this recording medium device.

BACKGROUND ART

Up to now, a tape cartridge having a magnetic tape accommodated in a main cartridge body unit has been in use as a recording medium for a recording and/or reproducing apparatus, such as a tape recorder or a video tape recorder. In this sort of the tape cartridge, such a tape cartridge having a tape width of 8 mm is in widespread use. The tape cartridge of this sort, now offered to the market, is classified into one used as a recording medium for a recording and/or reproducing apparatus used as external equipment for an information processing apparatus, such as a computer, for recording data signals, which are mainly digital signals, and one used as a recording medium for a video tape recorder for recording mainly video and audio signals. The tape cartridge used for recording data signals and the tape cartridge used for recording video and audio signals each comprise a magnetic tape, having a tape width of 8 mm, housed in a main cartridge body unit having a size and an outer profile corresponding to those of the magnetic tape. It is therefore extremely difficult to visually distinguish the tape cartridge used for recording data signals and that used for recording video or audio signals.

Meanwhile, the magnetic tapes housed in the tape cartridge used for recording data signals and that housed in the tape cartridge used for recording audio signals differ from each other as to design parameters of the magnetic medium etc. The magnetic tape used for a tape cassette for recording data signals is larger in storage capacity and is more strict in tolerance for an error rate for data signals than that used for recording video or audio signals. Thus, if the tape cartridge for recording video or audio signals is inadvertently loaded on a recording and/or reproducing apparatus for an information processing apparatus and used as a tape cartridge for recording data signals, there is presented a problem of failure in recording necessary data or data dropout due to shortage of the recording capacity.

Thus, as a tape cartridge housing a magnetic tape having a tape width of 8 mm, there is used a tape cartridge having an auxiliary recording member for storage of the information for the recording medium concerning the magnetic tape housed in the main cartridge body unit. Since a variety of the information other than the design parameters of the magnetic tape can be recorded on this auxiliary recording member, it is possible to enhance the range of application of the tape cartridge.

This tape cartridge has a main cartridge body unit within which is rotationally mounted a tape reel carrying a magnetic tape wound thereon. The magnetic tape is reeled outwardly of the main cartridge body unit through a tape pull-out opening provided in both sides of the front side of the main cartridge body unit, and is run across a pair of tape reels. On the front side of the main cartridge body unit is rotationally mounted a front lid adapted to cover the magnetic tape pulled out on the front side of the main cartridge body unit.

On one corner on the back side facing the front side of the main cartridge body unit, there is provided an auxiliary recording member having recorded thereon the recording medium information concerning a magnetic tape. This auxiliary recording member is made up of a wiring substrate, a storage element mounted on one surface of the wiring substrate and plural contact terminals printed on its other surface. The wiring substrate, carrying a variety of electric circuits, is arranged along a rear wall section of the main cartridge body unit. This auxiliary recording member is mounted in position by having both sides of the wiring substrate fitted in mating grooves formned along the rear wall section of the main cartridge body unit, with the storage element directing to the inner side of the main cartridge body unit and with the contact terminal directing to the outside thereof.

In the storage element, a variety of the recording medium information, such as the recording capacity, design parameters of the magnetic tape housed in the tape cartridge, use state or the contents of the information signals recorded on the magnetic tape. The contact terminals are the input/output terminal of the storage element, and are contacted with the connector connected to the auxiliary recording and/or reproducing unit for electrical connection. The recording medium information recorded on the storage element of the auxiliary storage member is read out by the auxiliary recording and/or reproducing unit provided in the recording and/or reproducing apparatus. Moreover, the updated new recording medium information is stored in the storage element.

In the above-described tape cartridge carrying the auxiliary storage member having the storage element, electrical connection with the auxiliary recording and/or reproducing unit of the recording and/or reproducing apparatus is necessitated in reproducing the recording medium information stored in the storage element or in storing the recording medium information in the storage element, such that the contact terminal is contacted with the connector each time the tape cartridge is loaded on the recording and/or reproducing apparatus. Thus, contact between the contact terminal and the connector is repeated such that contact deterioration is produced to render it impossible to perform reliable inputting/outputting of the recording and/or reproducing information.

DISCLOSURE OF THE INVENTION

It is an object of the present invention to provide a recording medium device in which the inputting/outputting of the recording medium information between an auxiliary storage medium having the recording medium information concerning the recording medium stored therein and the auxiliary recording and/or reproducing unit provided on the recording and/or reproducing apparatus may be realized in a contact-free fashion to render it possible to effect the inputting/outputting of the recording medium information.

It is another object of the present invention to provide a recording medium device reduced in size and simplified in structure.

It is another object of the present invention to provide a recording and/or reproducing apparatus which is able to use not only a tape cartridge having a transmission/reception unit in the auxiliary storage medium but also a conventional tape cartridge having an auxiliary storage medium carrying contact point terminals.

It is yet another object of the present invention to provide a recording and/or reproducing apparatus which realizes transmission/reception of the recording medium information during loading of the recording medium to shorten the loading time.

A recording medium device according to the present invention includes a main cartridge body unit for housing therein a recording medium on which to record information signals, and an auxiliary storage medium having a storage unit in which to store the recording medium information concerning the recording medium and a transmission/reception unit for inputting/outputting the recording medium information with a recording and/or reproducing apparatus in a non-contact fashion. The storage unit and the transmission/reception unit are arranged on the same substrate. The auxiliary storage medium is arranged in the main cartridge body unit so that the transmission/reception unit of the substrate carrying the storage unit along with the transmission/reception unit is exposed to outside through an opening provided in at least one lateral surface excluding the front surface operating as an intruding end of the main cartridge body unit into the inside of the recording and/or reproducing apparatus.

The auxiliary storage medium has an antenna for inputting/outputting the recording medium information with the recording and/or reproducing apparatus and the auxiliary storage medium is operated by driving signals supplied from the transmission/reception unit provided on the recording and/or reproducing apparatus.

The auxiliary storage medium comprises a first auxiliary substrate, having a storage unit, a second auxiliary substrate, carrying a primary coil constituting a transmission/reception unit, and a secondary coil constituting the transmission/reception unit in cooperation with the primary coil, with the first to third auxiliary substrates being layered and unified together.

The auxiliary storage medium is of substantially the same outer shape as the contact type auxiliary storage medium having contact point terminals adapted to effect information transmission/reception in contact with contact point terminals provided on the recording and/or reproducing apparatus. The auxiliary storage medium is adapted to be loadable on a main cartridge body unit of a recording medium device on which to load a contact type auxiliary recording medium device carrying contact point terminals so as to take the place of the contact type auxiliary storage medium, the contact type auxiliary recording medium device having contact point terminals for effecting information transmission/reception in contact with contact point terminals provided on the recording and/or reproducing apparatus.

A recording and/or reproducing apparatus according to the present invention comprises a loading unit on which to load a recording medium device, a recording and/or reproducing unit for recording and/or reproducing a recording medium when the recording medium device is loaded on the loading unit, a transmission/reception unit for effecting non-contact inputting/outputting of the recording medium information with the auxiliary storage medium having stored therein the recording medium information concerning the recording medium of the recording medium device, and an auxiliary recording and/or reproducing unit arranged facing the auxiliary storage medium of the recording medium device, or otherwise arranged in a manner not obstructing the loading of the recording medium, when the recording medium device is loaded on the loading unit.

This auxiliary recording and/or reproducing unit adopts the non-contact system of transmitting the modulated signal with the power overlaid thereon. To this end, the auxiliary recording and/or reproducing unit includes a transmission/reception unit for transmitting/receiving the recording medium information with the auxiliary storage medium of the recording medium device and for furnishing driving signals for driving the auxiliary storage medium.

The recording medium information is inputted/outputted with the auxiliary storage medium of the recording medium device during the loading of the recording medium to shorten the time needed for recording and/or reproduction of the recording medium.

Other objects and advantages of the present invention will become apparent from the following description which is made with reference to the accompanying drawings.

BEST MODE FOR CARRYING OUT THE INVENTION

Figure 1:
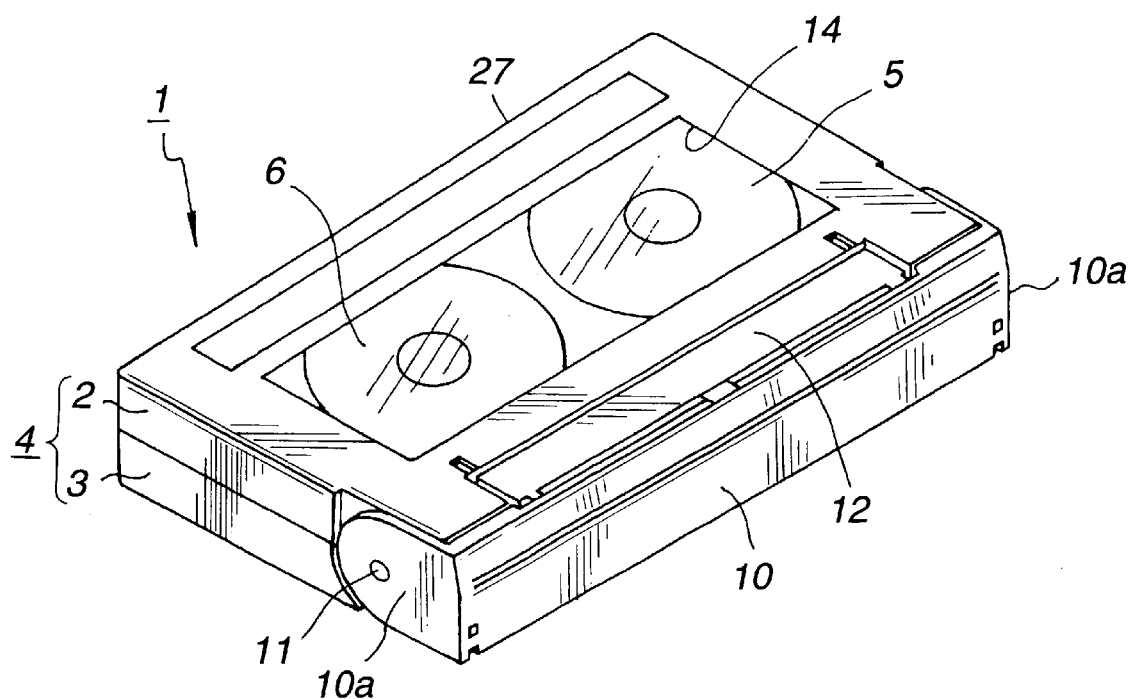
FIG. 1 is a perspective view of a tape cartridge according to the present invention.

Referring to the drawings, a tape cartridge embodying the present invention and a recording and/or reproducing apparatus for this tape cartridge are hereinafter explained.

A tape cartridge embodying the present invention houses therein a magnetic tape having a tape width of 8 mm. The tape cartridge 1 is used as a recording medium for the information processing apparatus, such as a computer, and is configured to have a sufficiently large recording capacity as compared to a tape recorder cartridge for a video tape recorder used exclusively for recording video and audio signals. The tape cartridge 1, configured for recording the data signals, is substantially coincident in outer profile with tape cartridge for a video tape recorder housing a magnetic tape with a tape width of 8 mm constructed mainly for recording video and audio signals, such that the tape cartridge 1 has the width, length and thickness in common with the tape cartridge for the video tape recorder.

Figure 2:
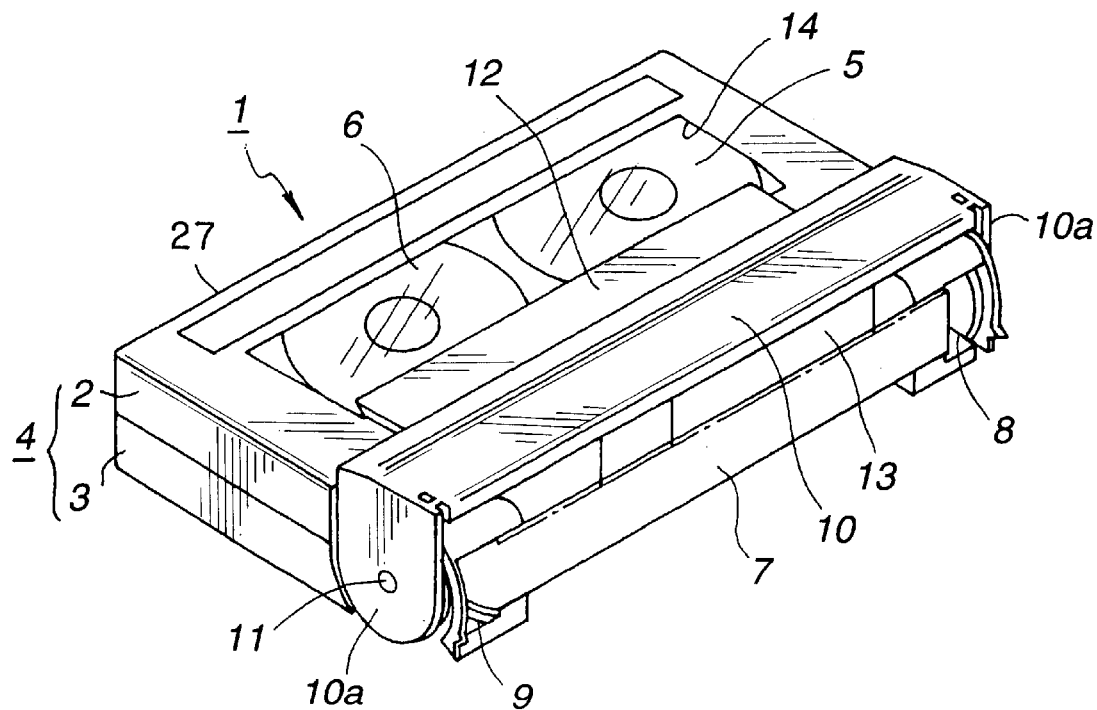
FIG. 2 is a perspective view showing the state in which the front lid of the tape cartridge is opened.

Similarly to the aforementioned tape cartridge for the tape recorder, this tape cartridge 1 includes a main cartridge body unit 4, combined and unified from the upper and lower halves 2, 3, and a pair of tape reels 5, 6 are rotatably fulcrumed within the main cartridge body unit 4, as shown in FIGS. 1 and 2. Across these tape reels 5, 6 is placed a magnetic tape 7 as the recording medium. As this magnetic tape 7, such a one is used which has the specifications such that information signals handled in the information processing apparatus such as a computer can be recorded with a sufficiently large recording capacity with optimum recording characteristics.

The magnetic tape 7, wound about the tape reels 5, 6, is pulled outwardly of the main cartridge body unit 4 via tape pull-out openings 8, 9 provided in both sides of the front surface of the main cartridge body unit 4, and is run across the tape reels 5, 6, as shown in FIG. 2.

On the front side of the main cartridge body unit 4 is rotatably mounted a lid 10 adapted for covering the magnetic tape 7 pulled out on the front side of the main cartridge body unit 4. This lid 10 includes rotary pieces 10a, 10a, protruded on both sides, and has these rotary pieces 10a, 10a pivotally mounted on both sides of the front surface of the main cartridge body unit 4 via a supporting pin 11. Thus, the lid 10 is rotated between the position of closing the front side of the main cartridge body unit 4 and the position of opening the front surface, about the supporting pin 11 as center, as shown in FIG. 2. On being rotated in this manner, the lid 10 opens or closes the front side of the main cartridge body unit 4. Meanwhile, an upper lid 12, adapted for covering a portion of the upper surface of the main cartridge body unit 4, is mounted on the lid 10 for rotation in synchronism therewith for covering a portion of the upper surface of the main cartridge body unit 4.

Figure 3:
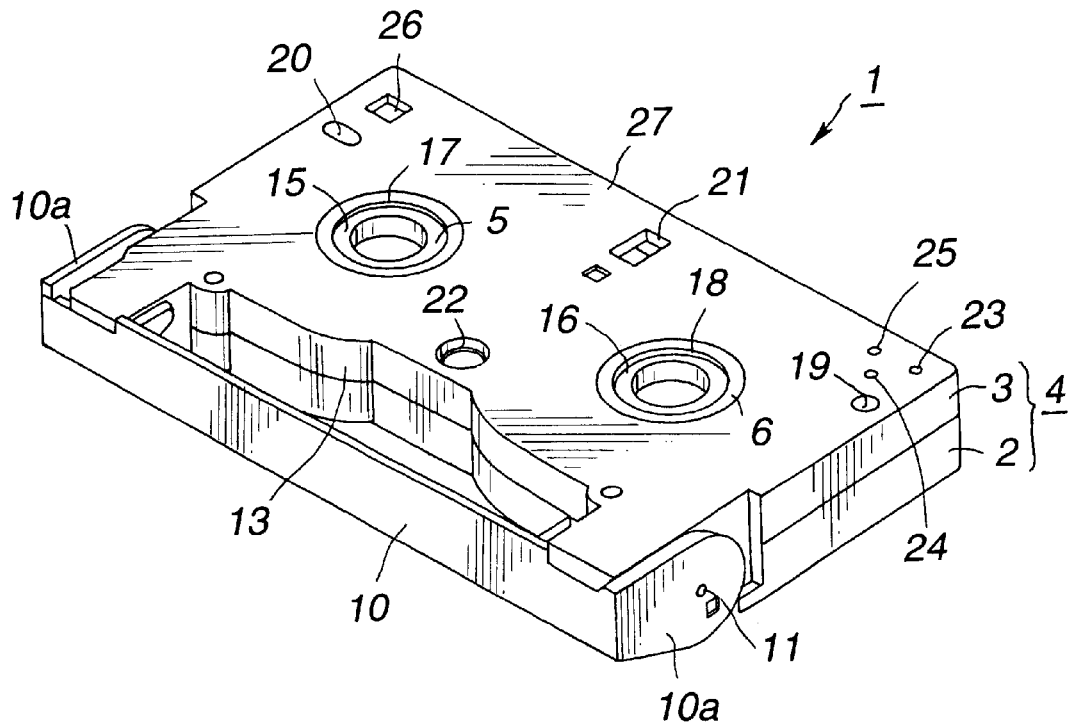
FIG. 3 is a perspective view showing the bottom side of the tape cartridge.
Figure 4:
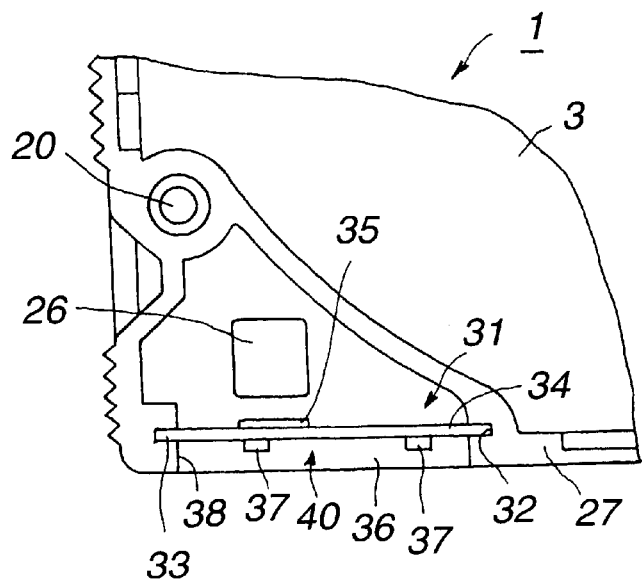
FIG. 4 is a plan view showing a portion of the tape cartridge housing the auxiliary storage medium.

In the front side of the main cartridge body unit 4, covered by the lid 10, there is formed a recess 13 into which is intruded a loading mechanism adapted for pulling out the magnetic tape 7 from the main cartridge body unit 4 to it on the tape running path within the recording and/or reproducing apparatus in which to load the tape cartridge 1, as shown in FIG. 3.

In the upper surface of the main cartridge body unit 4 is formed a rectangular viewing window through which to view the state of the magnetic tape 7 wound across the paired tape reels 5, 6.

In the bottom surface of the main cartridge body unit 4 are bored reel driving shaft inserting holes 17, 18, which permit hubs 15, 16 provided centrally of the tape reels 5, 6 to be exposed to outside, and which are engaged with the hubs 15, 16 to run the tape reels 5, 6 into rotation. In the bottom surface of the main cartridge body unit 4 on both lateral sides of the back surface thereof opposite to the front surface carrying the lid 10, there are bored positioning holes 19, 20 which are engaged by positioning pins provided on the recording and/or reproducing apparatus, when the tape cartridge 1 is loaded on the recording and/or reproducing apparatus, for setting the loading position. In the bottom surface of the main cartridge body unit 4 is bored a reel lock member actuating opening 21 centrally of the back surface for facing an actuating portion of a reel lock member restricting the free rotation of the tape reels 5, 6. In this reel lock member actuating opening 21 is intruded a reel unlock member provided on the recording and/or reproducing apparatus on loading the tape cartridge 1 on the recording and/or reproducing apparatus to cause movement of the reel lock member to unlock the tape reels 5, 6. In the bottom surface of the main cartridge body unit 4 is formed a light emitting element inserting opening 22 into which is intruded light emitting element constituting an end detection mechanism detecting the end of the magnetic tape 7 provided on the recording and/or reproducing apparatus, as shown in FIG. 3.

In the bottom surface of the main cartridge body unit 4 are formed two tape design parameter discriminating holes 23, 24, specifying the design parameters of the magnetic tape 7, such as its thickness or tape sort, as shown in FIG. 3. It is noted that the tape design parameter discriminating holes 23, 24 indicate that the magnetic tape 7 is of a thickness enabling recording of information signals and that the magnetic recording medium corresponds to the magnetic head of the recording and/or reproducing apparatus for recording information signals. A mistaken recording prohibiting hole 25 enables recording of information signals on the magnetic tape 7. That is, the mistaken recording prohibiting hole 25 is in a closed state.

In the bottom surface of the main cartridge body unit 4 at an opposite side corner towards the back surface proximate to the opposite side positioning hole 20 is bored a tape cartridge discriminating hole 26 indicating that the tape cartridge 1 is one for recording computer data and which is engaged by a mistaken loading prohibiting member provided on the recording and/or reproducing apparatus for prohibiting the mistaken loading of the tape cartridge 1. This discriminating hole 26 is of a rectangular profile larger than the tape design parameter discriminating holes 23, 24.

The positioning holes 19, 20, tape design parameter discriminating holes 23, 24, mistaken recording prohibiting hole 25 and the discriminating hole 26 are provided on an outer rim side of the tape reels 5, 6 housed in the main cartridge body unit 4. That is, the positioning holes 19, 20, tape design parameter discriminating holes 23, 24, mistaken recording prohibiting hole 25 and the discriminating hole 26 are provided on an outer rim side of the maximum winding diameter of the magnetic tape 7 wound about the tape reels 5, 6. Moreover, the positioning holes 19, 20, tape design parameter discriminating holes 23, 24, mistaken recording prohibiting hole 25 and the discriminating hole 26 are formed so as to be closer to the back surface of the main cartridge body unit 4 than a centerline interconnecting the positioning holes 19, 20 bored in both lateral sides of the main cartridge body unit 4. By providing the hole 23 to 26 in this manner, it is possible to prevent obstruction of the running of the magnetic tape 7 by this intrusion into these holes of detection means provided on the recording and/or reproducing apparatus to enable positive detection of the holes 23 to 26 by the detection means.

Within the inside of the main cartridge body unit 4, there is arranged an auxiliary storage medium 31 for recording a variety of information items, such as design parameters, use states or recording positions of the magnetic tape 7, contents of the information signals recorded thereon, or the number of times of recording or replay. The auxiliary storage medium 31 is provided towards the opposite side corner of the lower cartridge half 3 provided with the discriminating hole 26, such that the auxiliary storage medium extends along the inner lateral surface of the back side wall 27 of the lower cartridge half 3. In the inner lateral surface of the back side wall 27 are formed insertion grooves 32, 33 for mounting the auxiliary storage medium 31. It is by these insertion grooves 32, 33 that the auxiliary storage medium 31 is mounted within the main cartridge body unit 4.

Figure 5:
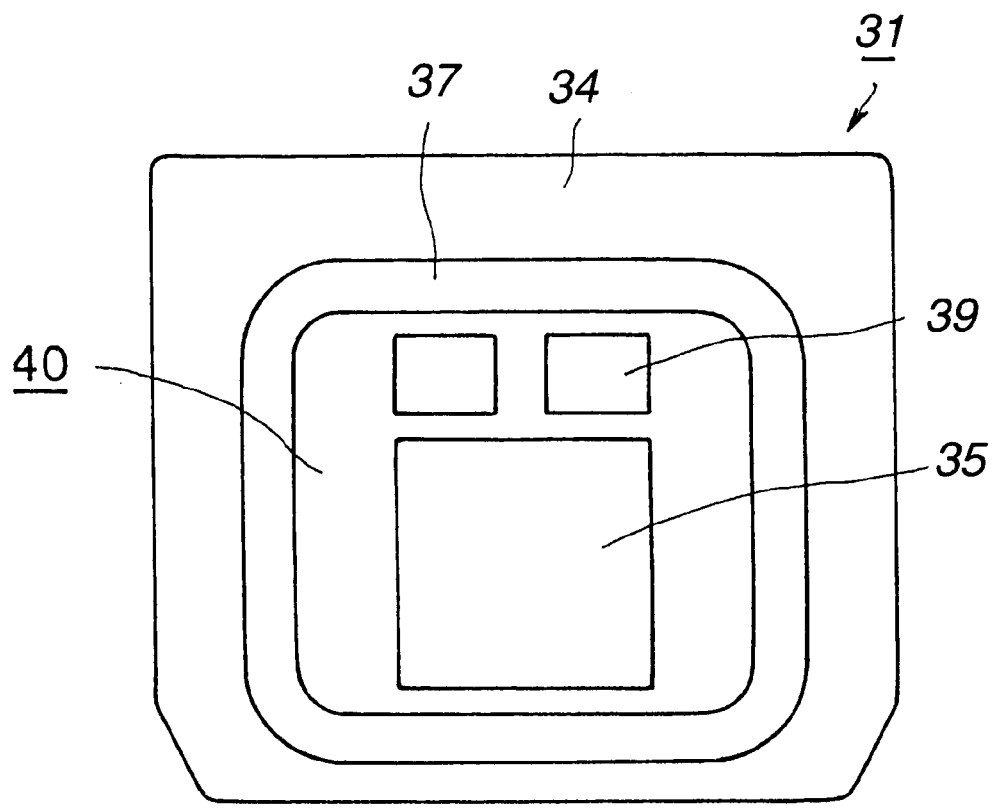
FIG. 5 is a plan view showing an auxiliary storage member.
Figure 6:
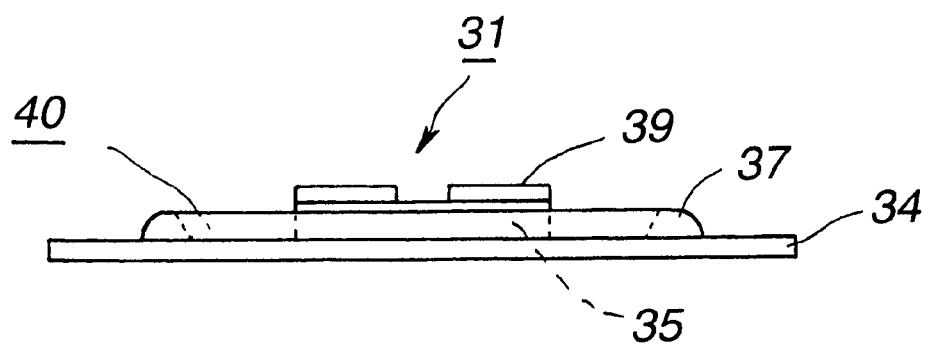
FIG. 6 is a cross-sectional view of the auxiliary storage unit.
Figure 7:
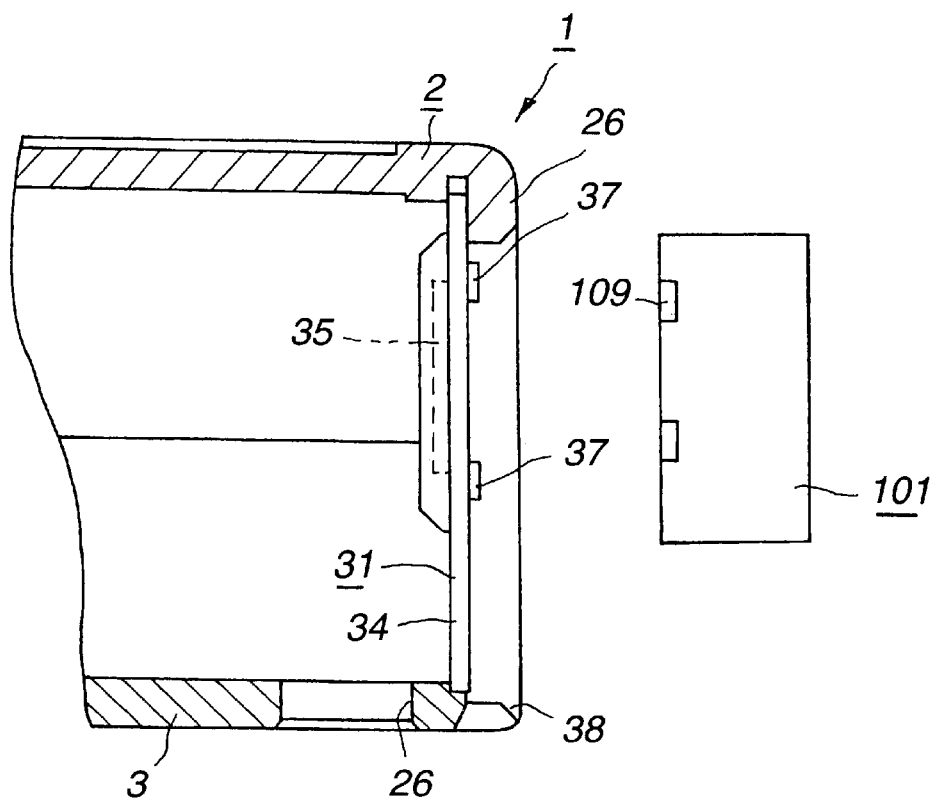
FIG. 7 is a schematic cross-sectional view showing a portion of the tape cartridge housing the auxiliary storage medium.
Figure 8:
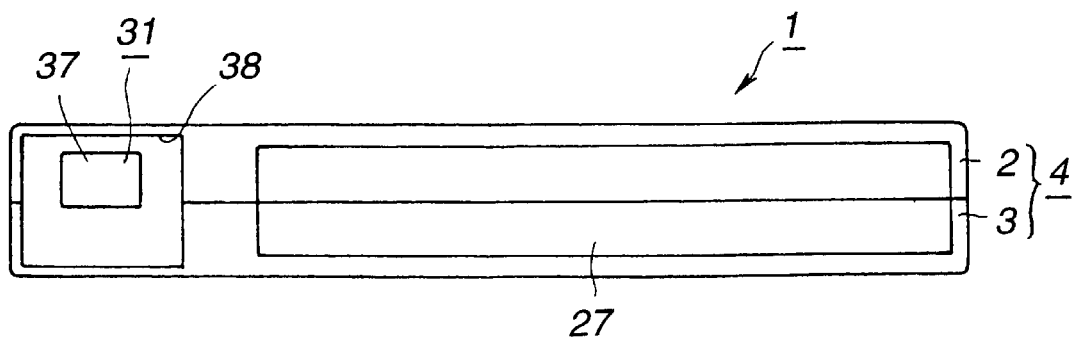
FIG. 8 is a back side view of the tape cartridge.

The auxiliary storage medium 31, mounted on the main cartridge body unit 4, includes a wiring substrate 34, on both surfaces of which are printed wirings, a storage element 35 mounted on one surface of the wiring substrate 34 and a coil-shaped antenna 37 mounted on the one surface of the wiring substrate 34 to constitute a transmission/reception unit 40, as shown in FIGS. 5 and 6. The auxiliary storage medium 31 is assembled to the lower cartridge half 3 by fitting both ends of the wiring substrate 34 into the insertion grooves 32, 33 so that the antenna 37 will be directed to the outside of the main cartridge body unit 4. The auxiliary storage medium 31 is reduced in size and simplified in structure by having the storage element 35 and the antenna 37 mounted on the same wiring substrate 34.

In the storage element 35 is stored a variety of recording medium information, such as the design parameters and use state of the magnetic tape 7 housed in the tape cartridge 1, contents of the information signals recorded on the magnetic tape 7 or the number of times of recording and replay of the magnetic tape 7. The antenna 7 transmits and receives the recording medium information over a radio path with an antenna 107 of an auxiliary recording and/or reproducing mechanism 101 on the recording and/or reproducing apparatus which takes charge of readout of the recording medium information recorded on the storage element 35 or updating of the recording medium information stored on the storage element 35. The auxiliary storage medium 31 is provided with a tuning point adjustment capacitor 39 connected to the antenna 37. The antenna 37 faces the outside of opening 38 to transmit or receive the recording medium information over a radio path with the ancillary recording and/or reproducing mechanism provided on the recording and/or reproducing apparatus to read out or update the recording medium information recorded on the storage element 35.

Meanwhile, the auxiliary storage medium 31 has, on its wiring substrate 34, a transmission/reception unit 40 comprised of the following elements. That is, referring to FIG. 9, the wiring substrate 34 includes the antenna 37 for receiving an electrical wave transmitted over the antenna of the transmission/reception unit of the auxiliary recording and/or reproducing mechanism of the recording and/or reproducing apparatus for the tape cartridge 1, a protection circuit 41 for protecting various circuits, an amplifier 42 for amplifying received signals, a demodulator 43 for demodulating the amplified reception signals for reproducing the recording medium information, a control circuit 44 for controlling the write/readout of the recording medium information, a memory 45 constituted by the storage element 35 adapted to store the recording medium information, a modulator 46 for modulating the carrier wave with the recording medium information read out from the memory 45, an amplifier 47 for amplifying the modulated signals from the modulator 46 for driving the antenna 37 and a rectifier circuit 48 for converting received signals into a dc voltage.

When updating the recording medium information of the memory 45 of the auxiliary storage medium 31, the antenna 37 sends the reception signals through the protection circuit 41 to the amplifier 42. The protection circuit 41 protects respective circuits of the auxiliary storage medium from an excessive electrical wave. The amplifier 42 amplifies the reception signals and routes the amplified signals to the demodulator 43. The demodulator 43 detects the amplified reception signals, that is the modulated amplitude signal, in accordance with, for example, an envelope detection system, to reproduce the recording medium information, which is supplied to the control circuit 44.

The control circuit 44 performs control of storing the data of the recording medium information in the memory 45. In more detail, if e.g., the number of times of recording or reproduction on or from the magnetic tape is to be updated, a command for updating the number of times of recording and data on the number of times of recording are sent in this order from the transmission/reception unit of the recording and/or reproducing apparatus. Based on the command, the control circuit 44 rewrites and updates the data on the number of times of recording stored in the memory 45.

The rectifier circuit 48 full-wave-rectifies and smooths the reception signals to generate a DC voltage required by the auxiliary storage medium 31 to send the generated DC voltage to respective circuits.

The operation of reading out the recording median information from the tape cartridge 1 to the transmission/reception unit of the auxiliary recording and/or reproducing mechanism of the recording and/or reproducing apparatus is hereinafter explained. For reading out the recording medium information from the memory 45 of the tape cartridge 1, a command for reading out the recording medium information from the recording medium information is first sent from the recording and/or reproducing apparatus to the auxiliary storage medium 31 of the tape cartridge. The control circuit 44 reads out required data from the memory 45 to route the read-out data to the modulator 46, which then modulates the carrier wave in accordance with a pre-set modulation method to send the modulated carrier wave to the amplifier 47. The amplifier amplifies the modulated signals to drive the antenna 37.

Meanwhile, in view of the actual use state of the tape cartridge 1, the auxiliary storage medium 31 contains no batteries, with the power for activating the respective circuits being fed from the recording and/or reproducing apparatus 60. That is, the auxiliary storage medium 31 of the tape cartridge 1 is fed with power in accordance with the non-contact system of transmitting the modulated signals overlaid with the power from a transmission/reception unit of the recording and/or reproducing apparatus for supplying the power.

If the recording medium information is to be inputted/outputted to or from the auxiliary recording and/or reproducing mechanism on the recording and/or reproducing apparatus over a radio path using the antenna 37, there is provided no contact part, and hence there occurs no degradation of the contact part, so that the recording medium information can be inputted/outputted reliably. In this manner, the recording medium information stored on the storage element 35 of the auxiliary storage medium 31 is read out by the auxiliary recording and/or reproducing mechanism provided on the recording and/or reproducing apparatus or on an independent auxiliary recording and/or reproducing apparatus. Moreover, the updated recording medium information is recorded on the storage element 35. Thus, with the present tape cartridge 1, the range of use is appreciably increased by exploiting a variety of the recording medium information in a manner highly meritorious in handling a large quantity of tape cartridges.

The opening 38 may be fitted with a shutter member for opening/closing the auxiliary storage medium 31. The auxiliary storage medium 31 may also be provided on e.g., an inner lateral surface of the lateral wall section running at right angles to the rear wall section 27, if the auxiliary storage medium does not obstruct the loading of the magnetic tape 7, it being not absolutely necessary to provide the auxiliary storage medium on the rear side wall 27 of the main cartridge body unit 4.

If the tape cartridge 1 is loaded on the recording and/or reproducing apparatus as described above, it is transported to the loading unit, which performs the recording and/or reproduction, by a movement mechanism responsible for transporting the tape cartridge to the loading position. At this time, the tape cartridge 1 is rotated by an opening mechanism opening the lid 10 on the recording and/or reproducing apparatus so that the recess 13 over which extends the magnetic tape 7 is exposed to the outside. The discriminating hole 26 of the main cartridge body unit 4 is engaged by a cartridge discriminating piece provided on the recording and/or reproducing apparatus to detect the loading. That is, the discriminating hole 26 operates as a discriminating hole for the tape cartridge 1 loading the auxiliary storage medium 31 thereon.

Figure 9:
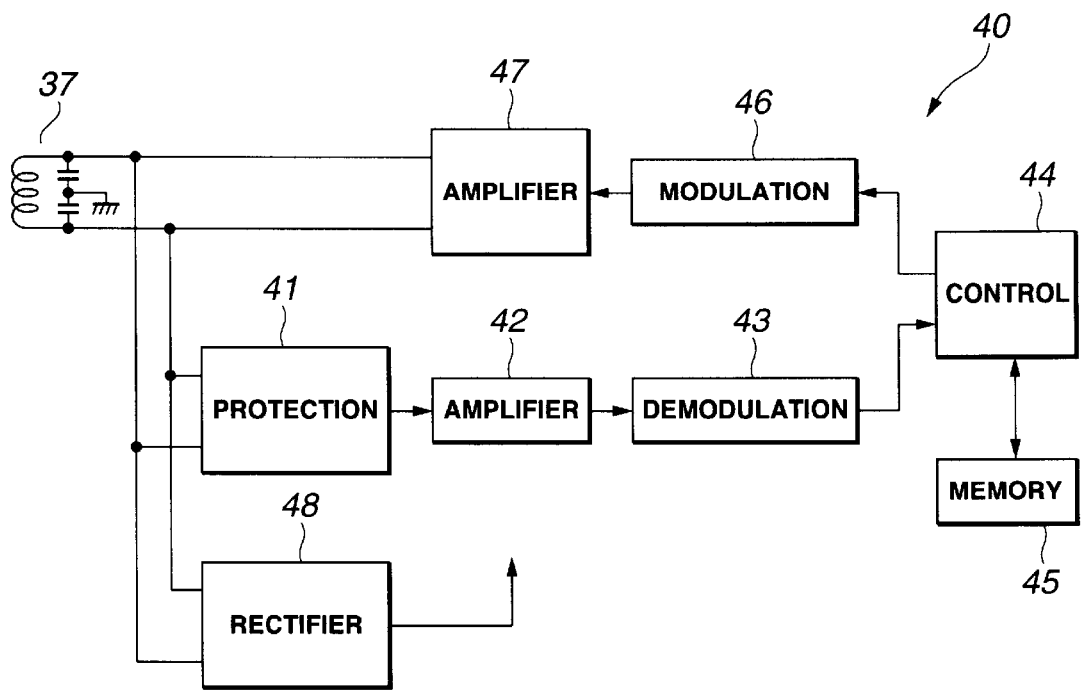
FIG. 9 is a block diagram showing a circuit structure of the auxiliary storage medium.

Also, a reel driving shaft provided on the recording and/or reproducing apparatus is intruded into the reel driving shaft inserting holes 17, 18 so that the reel driving shaft is engaged in the hubs 15, 16 of the tape reels 5, 6. Into the tape cartridge 1 is intruded an unlock member, provided on the recording and/or reproducing apparatus, from the reel lock member actuating opening 21, to act on the reel lock member in the main cartridge body unit 4 to unlock the tape reels 5, 6. The auxiliary storage medium 31, provided on the planar wall 27 of the main cartridge body unit 4, faces the auxiliary recording and/or reproducing mechanism provided on the recording and/or reproducing apparatus. When loaded on the loading unit of the recording and/or reproducing apparatus, the positioning pins on the loading unit are engaged in the positioning holes 19, 20 provided in the main cartridge body unit 4 to cause the tape cartridge 1 to be loaded in position on the loading unit. Thus, the auxiliary storage medium 31 of the main cartridge body unit 4 faces the auxiliary recording and/or reproducing mechanism provided on the recording and/or reproducing apparatus to permit reliable communication of the recording medium information. In more detail, if the recording medium information is to be read out from the tape cartridge 1 from the auxiliary storage medium 31 to the transmission/reception unit of the auxiliary recording and/or reproducing mechanism of the recording and/or reproducing apparatus, a command for reading out the recording medium information is sent to the auxiliary storage medium 31 of the tape cartridge 1 from the transmission/reception unit of the auxiliary recording and/or reproducing mechanism of the recording and/or reproducing apparatus. The control circuit 44 then reads out the necessary data from the memory 45 to route the read-out data to the modulator 46, as shown in FIG. 9. The modulator 46 modulates the carrier wave with the read-out data in accordance with a pre-set modulation system to route the amplified modulated signals to the amplifier 47. The amplifier amplifies the modulated signals to the antenna 37 to transmit the recording medium information to the transmission/reception unit of the auxiliary recording and/or reproducing mechanism on the recording and/or reproducing apparatus.

Simultaneously, the loading mechanism for pulling the magnetic tape 7 on the recording and/or reproducing apparatus to the rotary magnetic head as recording and/or reproducing means is intruded into the recess 13 of the tape cartridge 1 to pull out the magnetic tape 7 from the main cartridge body unit 4 to perform the loading to a pre-set tape path.

The read-out of the recording medium information is carried out after loading on the loading unit of the recording and/or reproducing apparatus until the end of loading of the magnetic tape 7. When the loading of the magnetic tape 7 comes to a close, the magnetic head is run in rotation so that the information signals recorded on the magnetic tape 7 is read or written by the magnetic head. The recording and/or reproducing apparatus is controlled based on this recording medium information.

If, on loading the tape cartridge 1 on the recording and/or reproducing apparatus, the auxiliary recording and/or reproducing mechanism detects that the number of times of recording and/or reproduction for the magnetic tape 7 stored in the auxiliary storage medium 31 has reached a preset value, the magnetic tape 7 is automatically cleaned by a mechanism adapted to clean the magnetic tape on the recording and/or reproducing apparatus. The state of the tape cartridge 1 is updated each time the tape cartridge 1 is loaded on the recording and/or reproducing apparatus, so that the latest state of the tape cartridge 1 is managed, and hence the tape cartridge 1 can be maintained at all times in an optimum state.

Also, if the recording and/or reproducing operation for the magnetic tape 7 comes to a close, the magnetic tape 7 is accommodated in the main cartridge body unit 4 by the aforementioned loading mechanism. When the loading operation comes to a close, the recording medium information updated by the auxiliary recording and/or reproducing mechanism of the recording and/or reproducing apparatus is recorded on the auxiliary storage medium 31. At this time, the updated recording medium information is written in the storage element 35 over a radio path. Specifically, the antenna 37 routes the reception signal through the protection circuit 41 to the amplifier 42, which then amplifies the reception signal to route the amplified signal to the demodulator 43. The demodulator detects the amplified reception signal to reproduce the recording medium information to route it to the control circuit 44. The control circuit performs control to store the recording medium information to be stored in the memory 45 to update the recording medium information.

Since the tape cartridge 1 is able to write the recording medium information over the radio path, and hence is free from an inconvenience of deterioration of contact terminals, as compared to the conventional tape cartridge employing the contact terminal, the recording medium information can be transmitted/received reliably. Since the circuitry such as the storage element 35 or the antenna is provided on the same wiring substrate 34, the auxiliary storage medium can be reduced in size and simplified in structure.

With the above-described auxiliary storage medium 31, transmission/reception of the recording medium information and power supply are performed in a contact-free state with respect to the recording and/or reproducing apparatus to reduce the size, it may also be designed to be compatible with respect to a contact type auxiliary storage medium having a contact terminal adapted to be contacted with the contact terminal for transmission/reception provided on the recording and/or reproducing apparatus.

Figure 10:
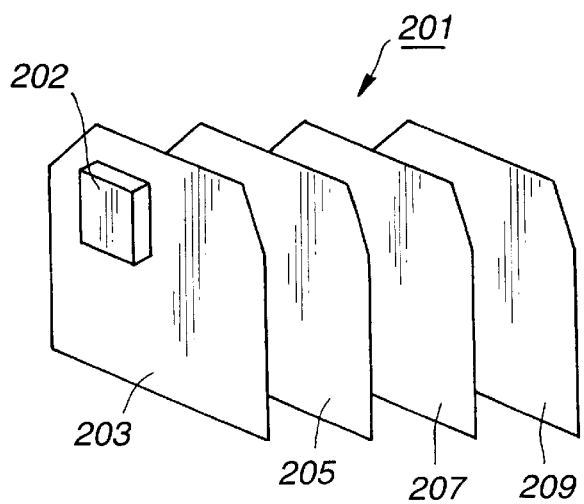
FIG. 10 is an exploded perspective view showing another embodiment of the auxiliary storage medium.
Figure 11:
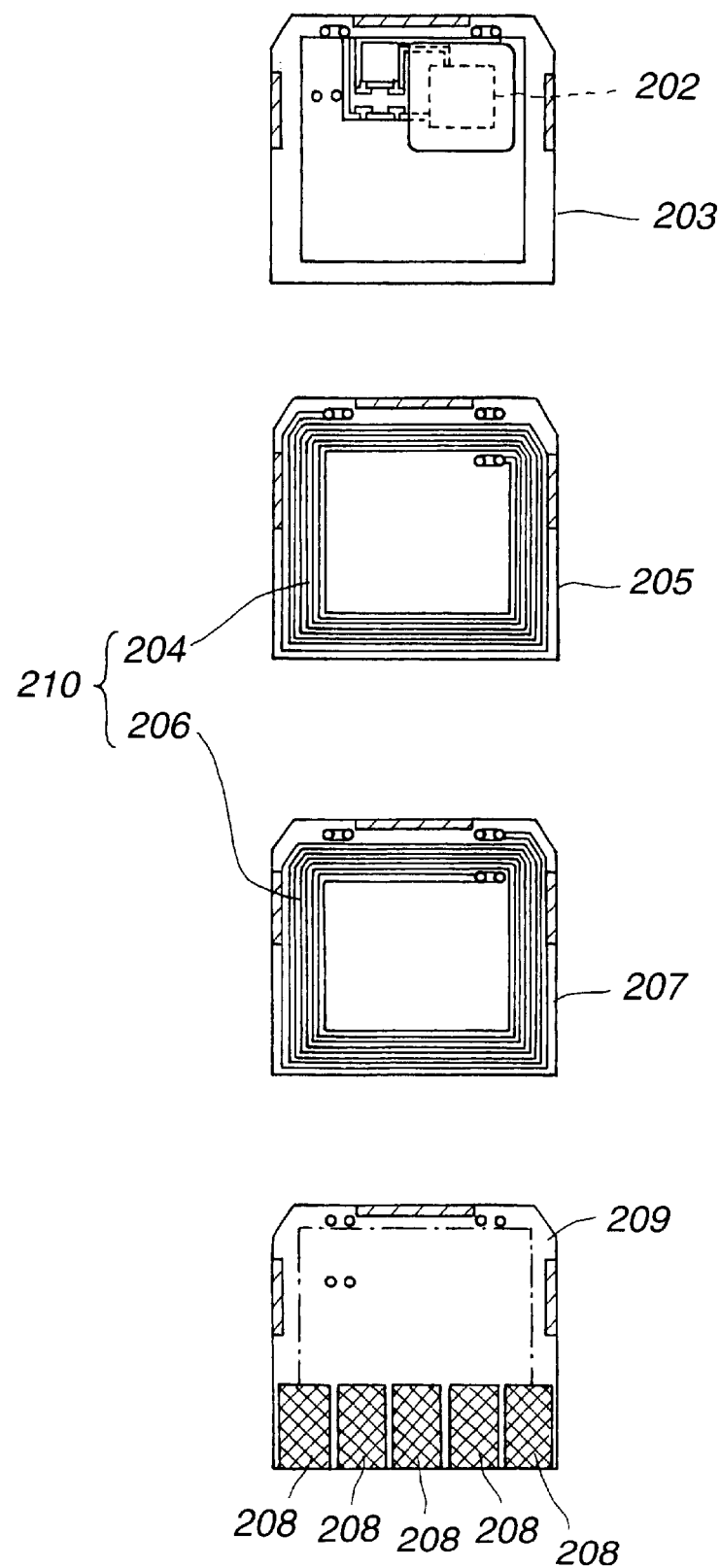
FIG. 11 is a front view showing first to fourth auxiliary substrates constituting the auxiliary storage medium shown in FIG. 10.
Figure 12:
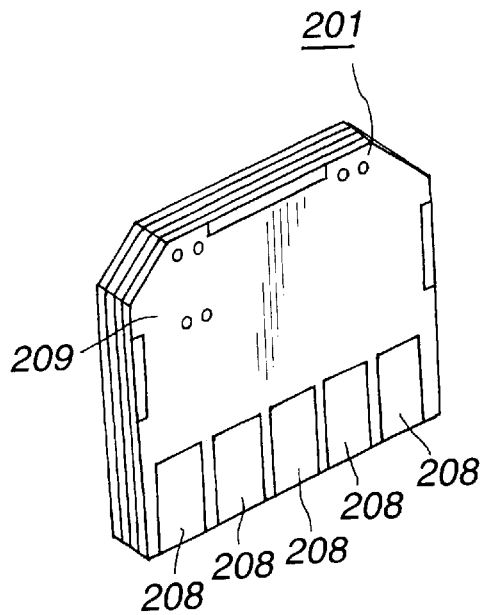
FIG. 12 is a perspective view showing another embodiment of the auxiliary storage medium.

Referring to FIGS. 10 and 11, this auxiliary storage medium 201 includes a first auxiliary substrate 203, provided with a memory 202, a second auxiliary substrate 205, formed with a primary coil 204, constituting a transmission/reception unit 210, a third auxiliary substrate 207, formed with a secondary coil 206, constituting a transmission/reception unit along with the primary coil 204, and a fourth auxiliary substrate 209, provided with plural protective terminals 208 contacted with the contact terminals provided on the recording and/or reproducing apparatus for protecting the communication terminals.

The primary coil 204 and the secondary coil 206 are formed by etching copper foils layered on the second auxiliary substrate 205 and on the third auxiliary substrate 207. The protective terminals 208 is formed by etching the copper foils layered on the fourth auxiliary substrate 209.

This auxiliary substrate 201 is formed by layering the first and fourth auxiliary substrates 203, 209 with the second auxiliary substrate 205 and the third auxiliary substrate 207 in-between and by unifying the auxiliary substrates together. At this time, the first auxiliary substrate 203 is layered so that its memory 202 faces outwards, whilst the fourth auxiliary substrate 209 is layered so that the protective terminal 208 faces outwards.

This auxiliary storage medium 201 is designed to be of substantially the same outer shape as the contact type auxiliary storage medium in which the contact terminal provided on the recording and/or reproducing apparatus is in contact with the contact terminal to transmit/receive the information. The protective terminal 208 is of the same size and provided at the sane position as the contact terminal provided on the contact type auxiliary storage medium adapted to be contacted with the contact terminal provided on the recording and/or reproducing apparatus to transmit/receive the information.

The first to fourth auxiliary substrates 203, 205, 207, 209, layered together, are formed to the same size.

The auxiliary substrate 201 may be interchangeably loaded on a tape cartridge employing a contact type auxiliary storage medium the contact terminal of which is contacted with the contact terminal provided on the recording and/or reproducing apparatus to transmit/receive the information.

By providing the protective terminal 208 as described above, the protective terminal 208 are contacted with the contact terminals of the recording and/or reproducing apparatus employing the tape cartridge having the contact auxiliary storage medium loaded thereon, thus preventing the contact terminals of the recording and/or reproducing apparatus from being worn out or damaged.

Figure 13:
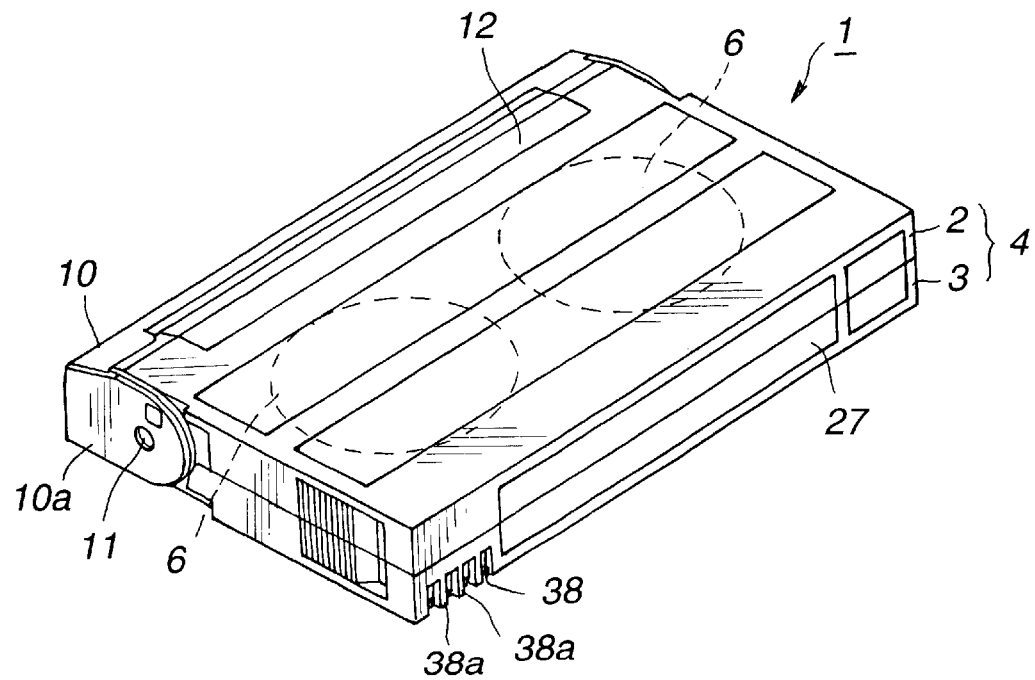
FIG. 13 is a perspective view showing a tape cartridge on which is loaded the auxiliary storage medium provided with a protective terminal.

The tape cartridge 1, on which is loaded the auxiliary storage medium 201 carrying the protective terminal 208, includes plural partition walls 38a, separating the protective terminal 208 from one another, in an opening 38 bored in the rear wall 27 of the main cartridge body unit 4, the protective terminal 208 of which are exposed to the outside, as shown in FIG. 13. By providing the partition wall 38a in this manner, the contact terminals provided on the recording and/or reproducing apparatus can be contacted with the associated protective terminal 208, without the contact terminals being contacted with one another.

In order for the auxiliary storage medium 201 carrying the protective terminal 208 to be loaded interchangeably on the tape cartridge employing the contact type auxiliary storage medium, it is sufficient if the auxiliary storage medium 201 carrying the protective terminal 208 is of substantially the same shape as the contact type auxiliary storage medium, it being not absolutely necessary to provide the protective terminal 208. Therefore, the auxiliary storage medium 31, constructed as shown in FIGS. 5 and 6, may be loaded interchangeably on the tape cartridge employing the contact type auxiliary storage medium. Moreover, by providing the wiring substrate 34 with a protective terminal contacted with the contact terminal of the recording and/or reproducing apparatus employing the tape cartridge having loaded thereon the contact type auxiliary storage medium, it is possible to prevent the wear or damage to the contact terminal on the recording and/or reproducing apparatus.

A recording and/or reproducing apparatus used on the above-described tape cartridge 1 is explained with reference to the drawings. This recording and/or reproducing apparatus 60 features transmitting/receiving the recording medium information stored on the auxiliary storage medium using a radio path or through contact terminals with the auxiliary storage medium 31 of the tape cartridge.

Figure 14:
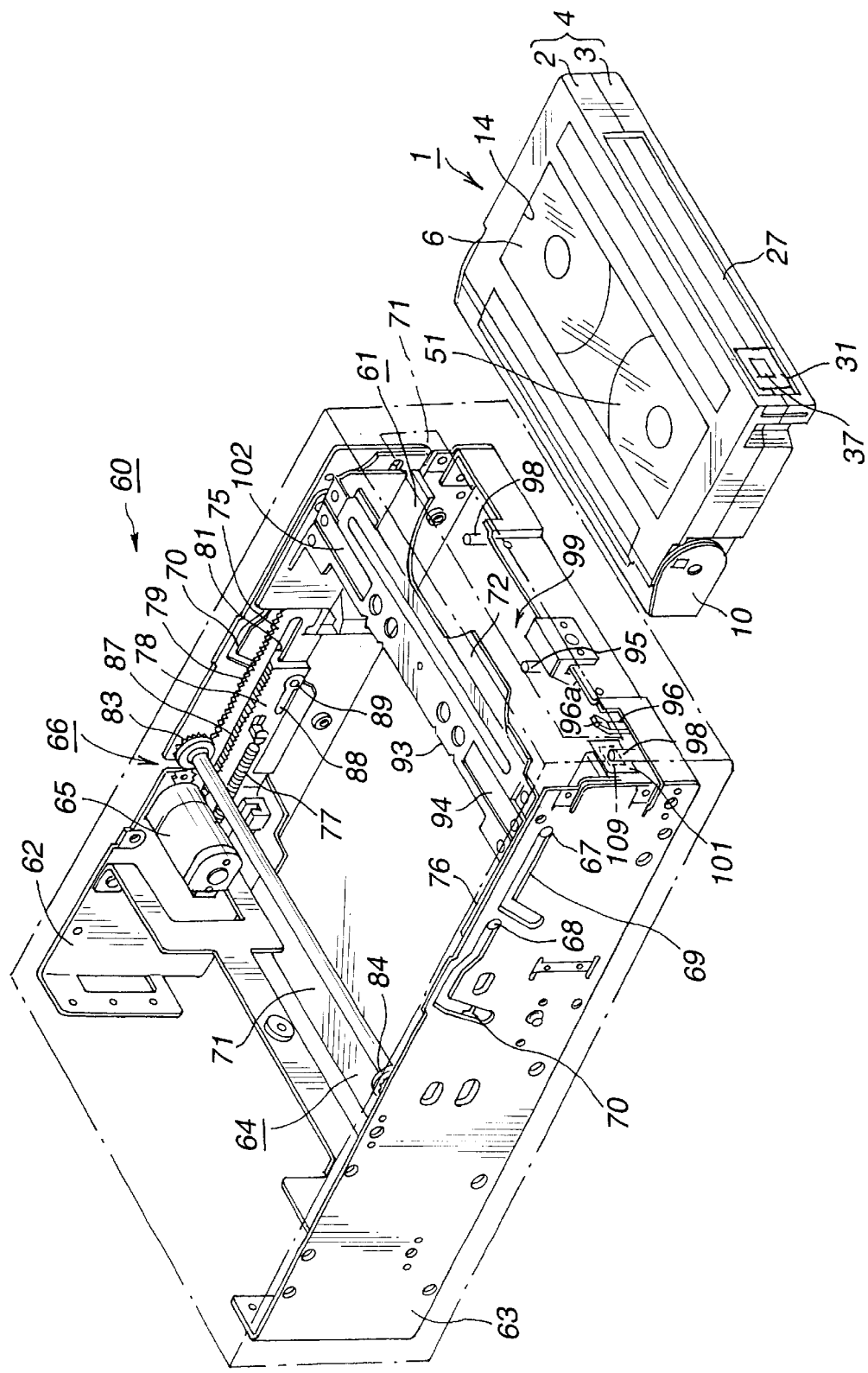
FIG. 14 is a perspective view showing a recording and/or reproducing apparatus employing a tape cartridge according to the present invention.
Figure 15:
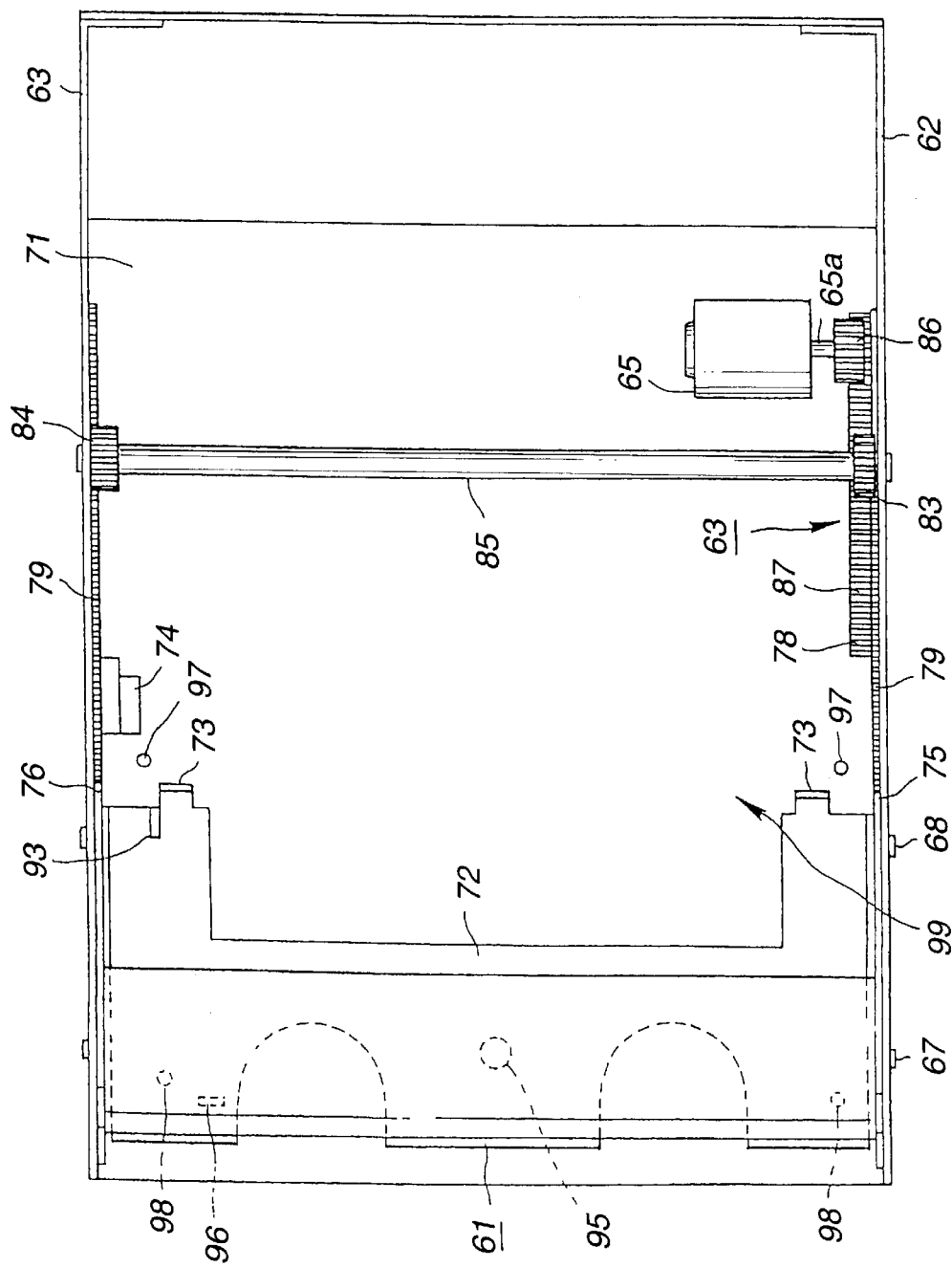
FIG. 15 is a plan view of the recording and/or reproducing apparatus.

This recording and/or reproducing apparatus 60 includes a chassis 64, in which is inserted and held the tape cartridge 1, and a chassis 64, having a pair of side plates 62, 63, adapted for movably supporting the cartridge holder 61 between the cartridge inserting/detachment position and the cartridge loading position, as shown in FIGS. 14 and 15. This recording and/or reproducing apparatus 60 includes a holder movement actuating mechanism 66 for causing the movement of the cartridge holder 61 between the cartridge inserting/ejecting position and the cartridge loading position, as shown in FIGS. 15 and 16.

On both lateral sides of the cartridge holder 61 are protuberantly formed paired slide guide pins 67, 68. The cartridge holder 61 is arranged between the side plates 62, 63, set upright on both opposing sides of the chassis 64, by having these slide guide pins 67, 68 introduced into and supported by slide guide grooves 69, 70 formed in the side plates 62, 63. The cartridge holder 61 is moved between the cartridge loading position and the cartridge loading enabling position by being guided as to its movement direction by the slide guide pins 67, 68.

Figure 16:
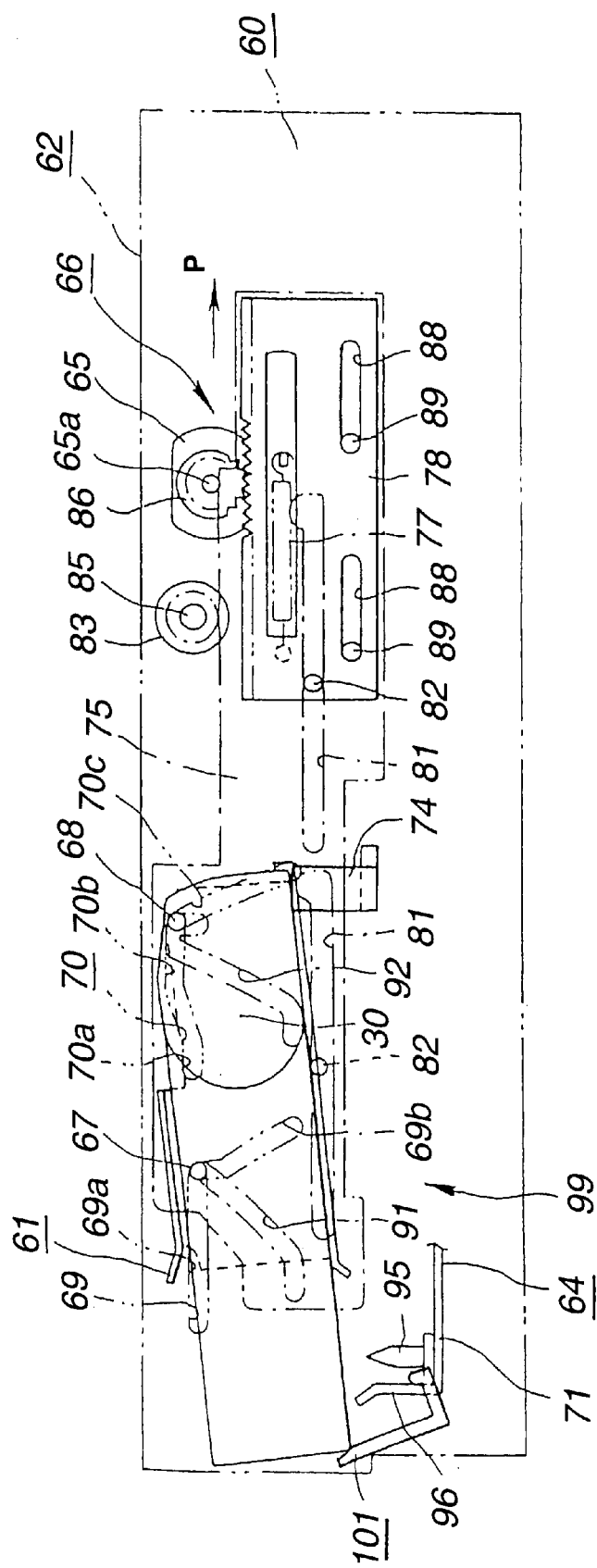
FIG. 16 is a side view of a cartridge loading device showing an initial operating state in which the cartridge is inserted and held in the cartridge holder and in which the cartridge holder is pulled towards the cartridge loading device.

The slide guide groove 69, provided outwardly of the main cartridge body unit, sequentially has a horizontal guide groove 69a and an inclined guide groove 69b, inclined towards a cartridge loading unit 99 formed on a bottom plate 71 of the chassis 64, as shown in FIG. 16. The opposite side slide guide groove 70, provided on the inner side of the main cartridge body unit, sequentially includes an inclined guide groove 70a, inclined upwards from the bottom plate 71 of the chassis 64, a horizontal guide groove 70b and an inclined guide groove 70c inclined towards the cartridge lading unit 99, as shown in FIG. 16. The cartridge holder 61, moved from the cartridge loading/unloading position to the cartridge loading enabling position, as the cartridge holder 61 is guided by the slide guide grooves 69, 70, is elevated so that its front side is rotated momentarily upwards about the slide guide pin 67 introduced into the slide guide groove 69, and is subsequently rendered parallel to the bottom plate 71 of the chassis 64, so as to be then lowered towards the bottom plate 72 of the chassis 64.

On the forward end side of the cartridge holder 61, that is on both lateral sides of the front end along the tape cartridge inserting direction, there are protuberantly formed abutment pieces 73, 73 adapted to compress against a portion of the front end face of the tape cartridge 1 to control the inserting position of the tape cartridge 1. On the side of the bottom plate 72 of the cartridge holder 61 provided with one of the abutment pieces 73, 73, there is formed an unlock piece 93 for rotationally actuating a lock lever adapted for locking the lid 10 of the tape cartridge 1 inserted into and held by the cartridge holder 61 to unlock the lid 10.

The holder movement actuating mechanism 66 includes a pair of slide plates 75, 76, arranged on the inner lateral sides of the side plates 62, 63, and a limiter plate 78 connected via a limiter spring 77 on the slide plate 75, as shown in FIGS. 15 and 16. In the upper edges of the paired slide plates 75, 76 are formed rack gears 79 for extending along the longitudinal direction the slide plates 75, 76. The slide plates 75, 76 are formed with longitudinally bored elongated holes 81 passed through by the supporting pins 82 set upright on the side plates 62, 63, so that the slide plates 75, 76 are supported for movement through the extent of the elongated holes 81. The paired slide plates 75, 76 are interconnected by a driving power transmission shaft 85 carrying end gears 83, 84 meshing with the rack gears 79, 79, so that the slide plates 75, 76 are slid in synchronism with each other in the same direction. In the upper edge of the limiter plate 78 is formed a rack gear 87 engaged by a driving gear 86 mounted on an output shaft 65a of the driving motor 65 mounted on the side plate 65.

The limiter plate 78, connected through the limiter plate 78 to the slide plate 75, has an elongated opening 88 having its long axis extending in the longitudinal direction. The limiter plate 78 has this elongated opening 88 engaged by a supporting pin 89 set upright on the slide plate 75, so that it is supported for movement relative to the slide plate 75 within the extent of the elongated opening 88. Thus, if an excess load is applied to the limiter plate 78, the limiter plate 78 permits movement of the slide plates 75, 76, as the limiter plate 78 is extended, to absorb the excess load.

In the paired slide plates 75, 76 are bored paired cam grooves 91, 92. In these cam grooves 91, 92 are inserted slide guide pins 67, 68 of the cartridge holder 61 inserted into and supported by the slide guide grooves of the side plates 62, 63, respectively. The cain grooves 91, 92 control the direction of movement of the slide guide pins 67, 68 so that the slide guide pins 67, 68 are moved along the slide guide grooves 69, 70.

On the inner lateral side of the other side plate 63, there is provided a lid opening member 74 for rotating the lid 10 of the tape cartridge 1, descending from the cartridge loading enabling position towards the cartridge loading unit 99 against the bias of the biasing member to open the front side of the main cartridge body unit 4 along which is extended the magnetic tape 7 to the expose the magnetic tape 7 to outside, as shown in FIG. 15.

On the bottom plate 72 of the chassis 64, there is provided a reel unlock member 95 for releasing the locking by the reel lock member of the paired tape reels 5, 6 of the tape cartridge 1 loaded on the cartridge loading unit 99. When the tape cartridge 1 is loaded on the cartridge loading unit 99, the reel unlock member 95 is inserted into the reel lock member actuating opening 21 formed in the bottom surface of the main cartridge body unit 4 to move the reel lock member towards the back side of the main cartridge body unit 4, against the biasing force of the biasing means, to unlock the tape reels 5, 6 to enable the rotation of the tape reels 5, 6.

On the bottom plate 71 of the chassis 64, there is formed upright a cartridge discriminating piece 96 of a cartridge discriminating mechanism for discriminating the tape cartridge 1 loaded on the cartridge loading unit 99, as shown in FIGS. 14 to 16. This cartridge discriminating piece 96 is formed by partially segmenting the bottom plate 71. When the tape cartridge 1 is loaded on the cartridge loading unit 99, the cartridge discriminating piece 96 is intruded into a discriminating hole 26 formed in the bottom surface of the main cartridge body unit 4 to discriminate that the tape cartridge 1 loaded on the recording and/or reproducing apparatus is one for data recording. If the tape cartridge not having the discriminating hole 26 is loaded, the cartridge discriminating piece 96 compresses against the bottom surface of the main cartridge body unit to inhibit further loading of the tape cartridge to control the mistaken loading. Meanwhile, the cartridge discriminating piece 96 has its distal end warped slightly to provide an inclined portion 96a in keeping with the locus of movement of the tape cartridge loaded as it is held by the cartridge holder 61.

On the bottom surface 71 of the chassis 64, there are formed a pair of height setting pins 97, 97 adapted to support the bottom surface of the tape cartridge 1 loaded on the cartridge loading unit 99 and a pair of positioning pins 98, 98 engaged in the positioning holes 19, 20 provided in the bottom surface of the tape cartridge 1.

Figure 17:
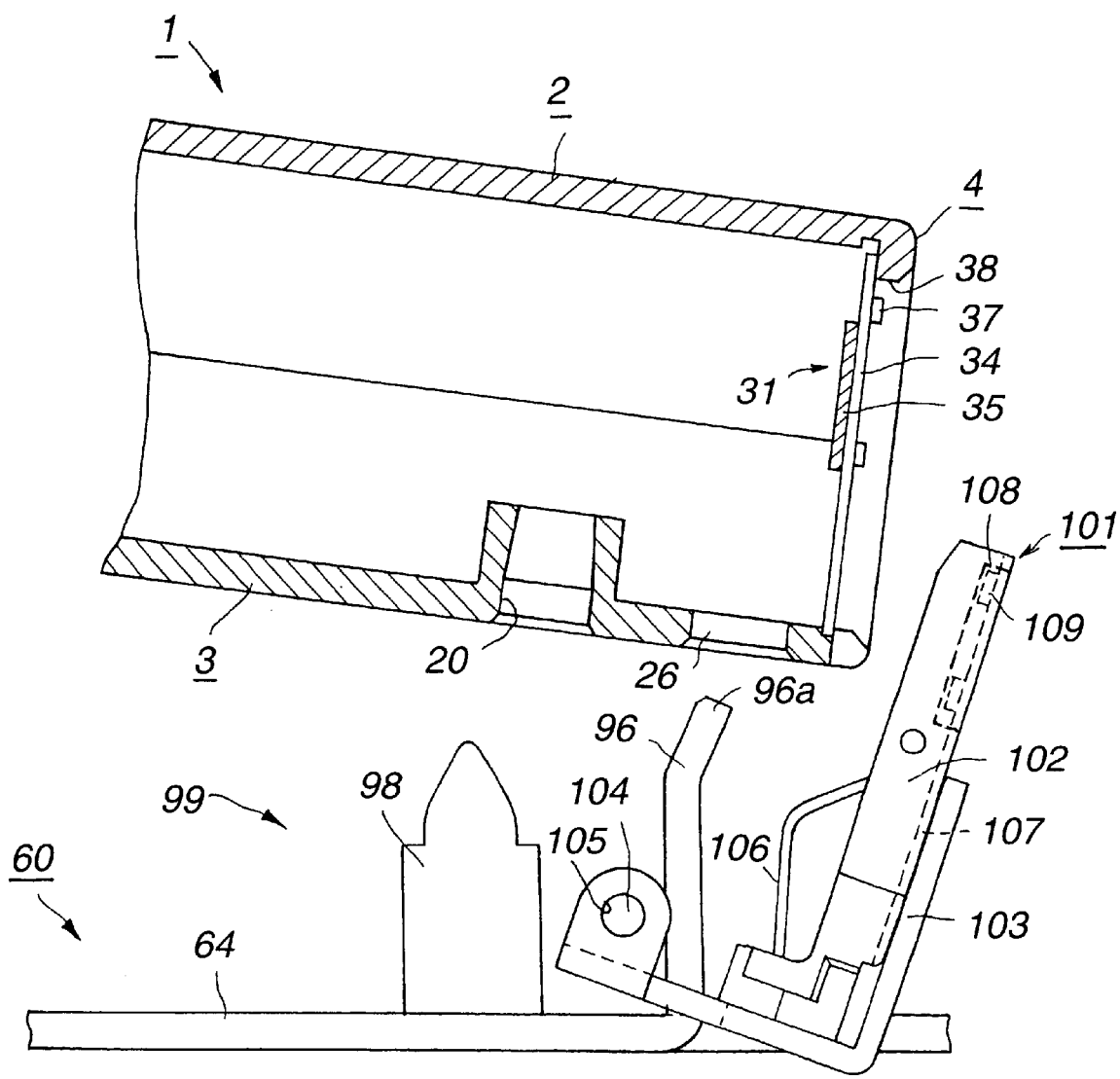
FIG. 17 is a schematic cross-sectional view showing the operation of loading the tape cartridge on the recording and/or reproducing apparatus.
Figure 18:
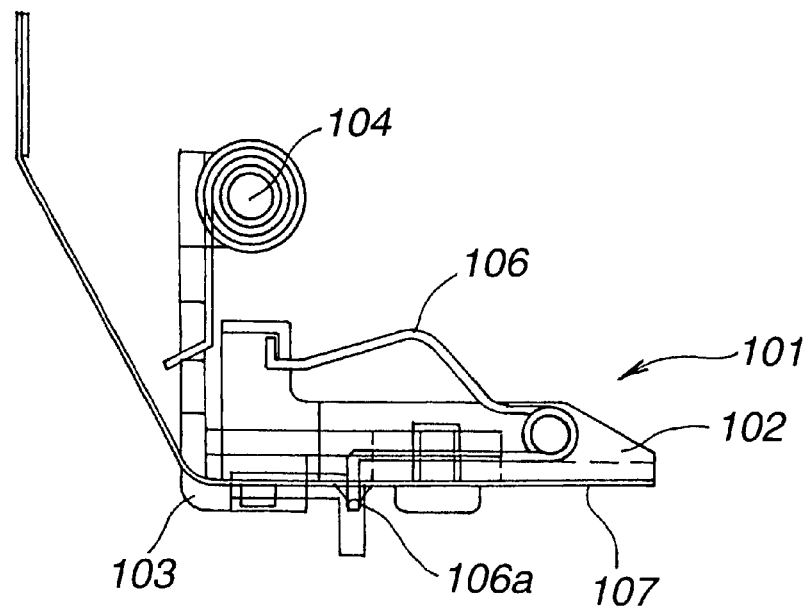
FIG. 18 is a side view showing an auxiliary recording and/or reproducing mechanism.
Figure 19:
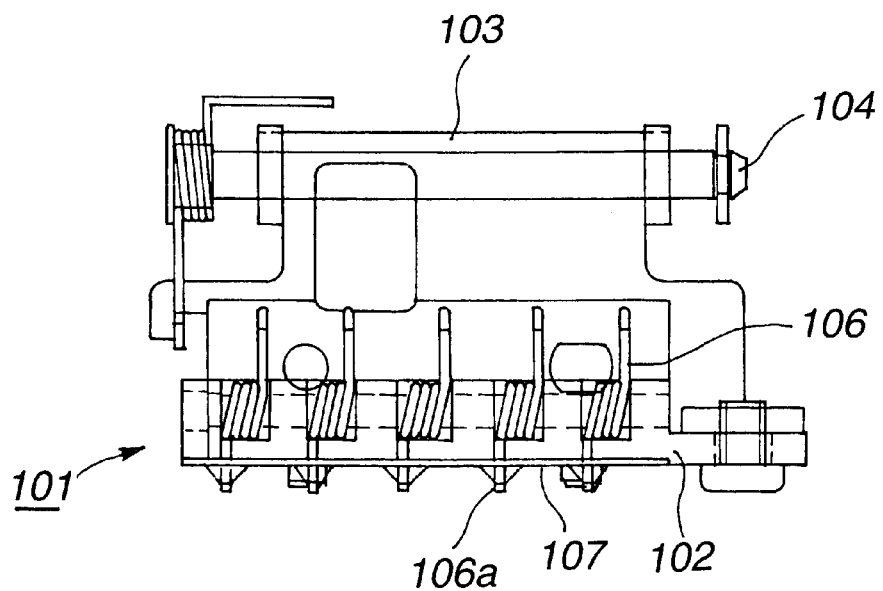
FIG. 19 is a plan view showing the auxiliary recording and/or reproducing mechanism.
Figure 20:
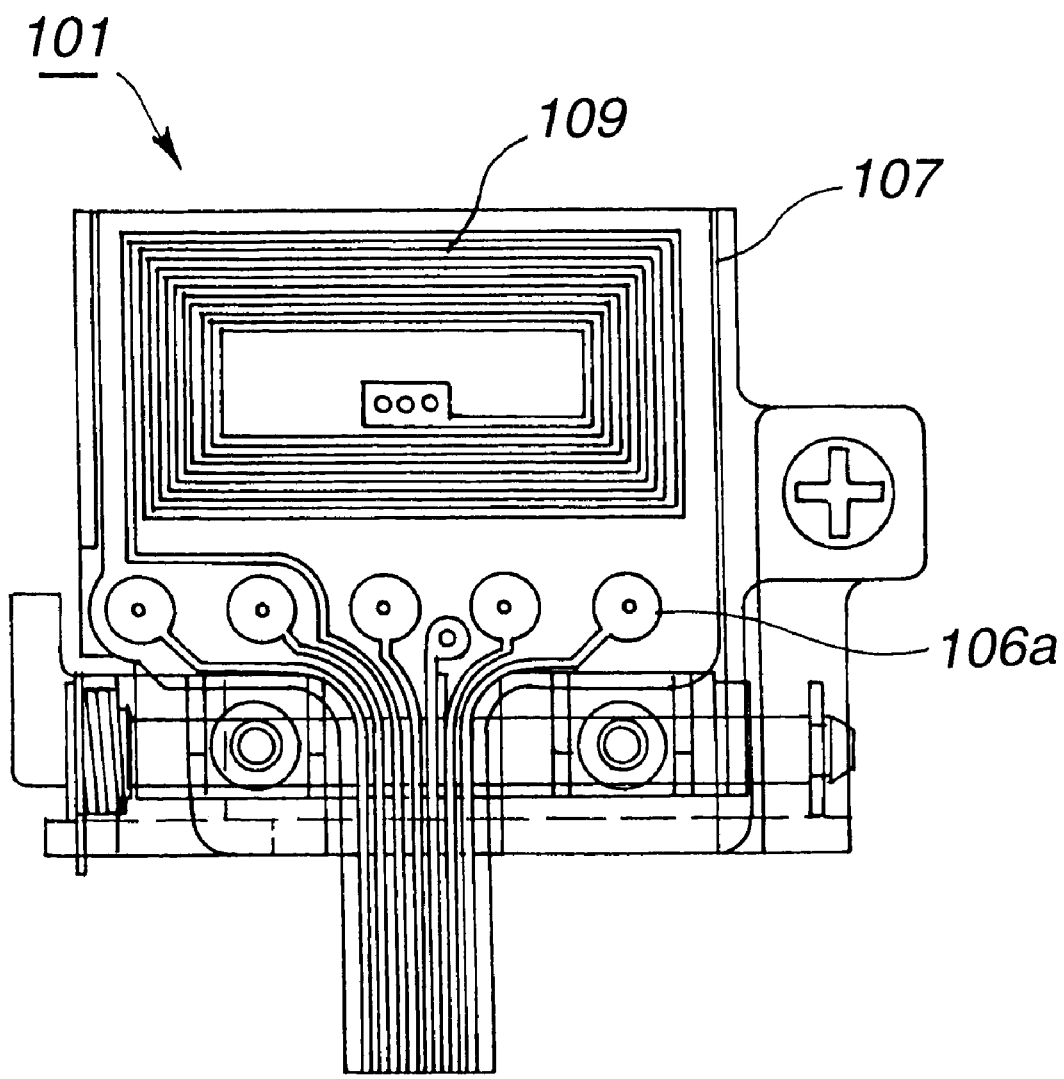
FIG. 20 is a bottom view showing a wiring substrate constituting the auxiliary recording and/or reproducing mechanism.

The cartridge loading unit 99 is provided with an auxiliary recording and/or reproducing mechanism 101 for reading out the recording medium information recorded on the auxiliary storage medium 31 of the tape cartridge 1 or reading out the recording medium information stored on the auxiliary storage medium 31, as shown in FIGS. 17 to 19. This auxiliary recording and/or reproducing mechanism 101 is provided in the vicinity of the insertion/ejection opening 71 of the recording and/or reproducing apparatus 60, as shown in FIG. 17. That is, the recording and/or reproducing mechanism 101 is provided facing the auxiliary storage medium 31 of the tape cartridge 1 so as not to obstruct the loading operation of the magnetic tape 7.

The auxiliary recording and/or reproducing mechanism 101 has a base 103 for mounting a substantially L-shaped connector 102, as shown in FIGS. 17 to 19. The base 103 has in its end a through-hole 105 passed through by a pivot 104 provided on the chassis 64, and is rotatably carried by a shaft 104 passed through the through-hole 105. When the tape cartridge 1 is loaded on the base 103, the base 103 is rotated so that the connector 102 faces the auxiliary storage medium 31 of the tape cartridge 1. The connector 102 is to an arm of the base 103.

The recording and/or reproducing apparatus 60 is configured for enabling the use of a tape cartridge employing a contact type auxiliary storage medium. Thus, the connector 102 is provided with plural contact point terminals 106 which are intruded from the opening 38 into contact with the contact terminals when the conventional disc cartridge having the contact terminal in the auxiliary storage medium is loaded on the cartridge loading unit 99 of the recording and/or reproducing apparatus 60. The contact terminal 106 is formed of an elastic electrically conductive metal material and is substantially chevron-shaped so as to be contacted with the contact terminal 36 of the tape cartridge 1. A number of contact point terminals 106 corresponding to the number of the contact terminals 36 of the tape cartridge 1 are provided and used for writing and for read-out of the recording medium information.

If the tape cartridge having loaded thereon an auxiliary storage medium 201 having the protective terminal 208 is loaded on the recording and/or reproducing apparatus 60, the contact point terminal 106 is contacted with the protective terminal 208.

Figure 21:
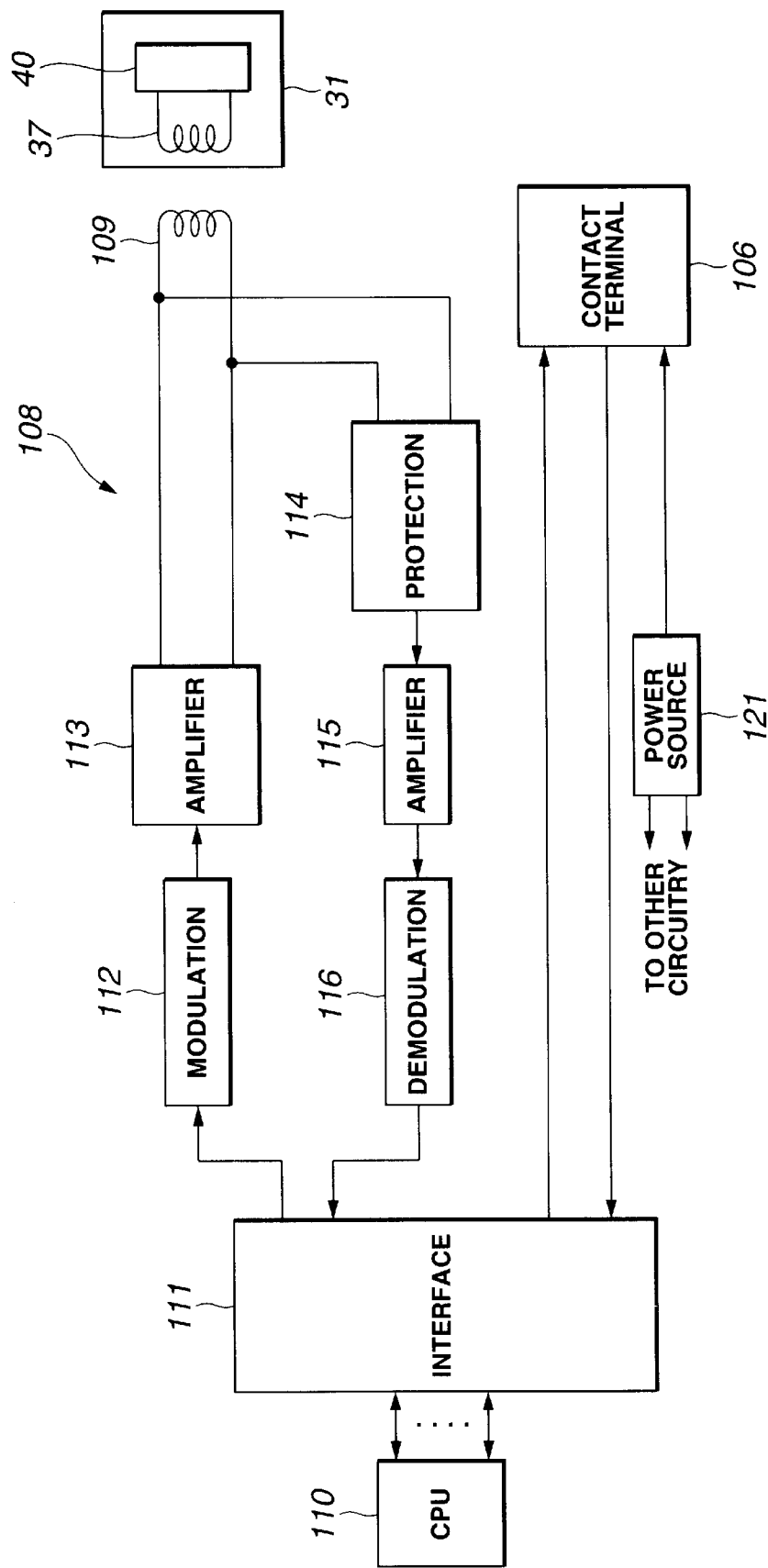
FIG. 21 is a block diagram of a transmission/reception unit constituting the auxiliary recording and/or reproducing mechanism.

The base 103 is provided with a wiring substrate 107 having an electric circuit constituting the transmission/reception unit 108 for transmission/reception with the auxiliary storage medium 31 of the tape cartridge 1, as shown in the block circuit diagram of FIG. 21. The wiring substrate 107 is provided with a coil-shaped antenna 109 similarly constituting a transmission/reception unit in keeping with the antenna 37 of the transmission/reception unit provided in the auxiliary storage medium 31 of the tape cartridge 1. This antenna 109 is provided at such a position that, when the tape cartridge 1 is loaded in position, the antenna 109 faces the antenna 37 provided on the tape cartridge 1. This wiring substrate 107 is provided with a number of electrodes 106a, contacted with the contact point terminals 106, corresponding to the number of the contact point terminals 106.

Referring to FIG. 21, this transmission/reception unit 108 includes a central processing unit (CPU) 110, controlling the entire system, a modulator 112 for modulating the recording medium information, an amplifier 113, for amplifying the recording medium information for driving the antenna 109, a protection circuit 114 for protecting respective circuits, an amplifier 115 for amplifying reception signals from the auxiliary storage medium 31 of the tape cartridge 1, and a demodulator 116 for demodulating the modulated reception signals for reproducing the recording medium information stored in the auxiliary storage medium 31.

For storing the recording medium information in the auxiliary storage medium 31 of the disc cartridge 1, that is for storing the updated recording medium information in the auxiliary storage medium 31, the CPU 110 routes the updated recording medium information through an interfacing circuit 111 to a modulator 112, which then modulates the carrier with the recording medium information to route the resulting modulated signal to the amplifier 113. The amplifier amplifies this modulated signal to drive the antenna 109, that is causes the current to flow in the antenna 109. In this manner, the electrical wave corresponding to the recording medium information is transmitted to the antenna 37 of the auxiliary storage medium 31 of the tape cartridge 1.

When reading out the recording medium information stored in the auxiliary storage medium 31 of the tape cartridge 1, the antenna 109 feeds the amplifier 115 through the protection circuit 114, which is a circuit for protecting the respective circuits of the auxiliary storage medium from e.g., an excessive electrical wave. The amplifier 115 amplifies the reception signals to send the amplified signal to the demodulator 116. The demodulator 116 detects the amplified reception signals to route the reproduced signal through the interfacing circuit 111 to the CPU 110.

Figure 22:
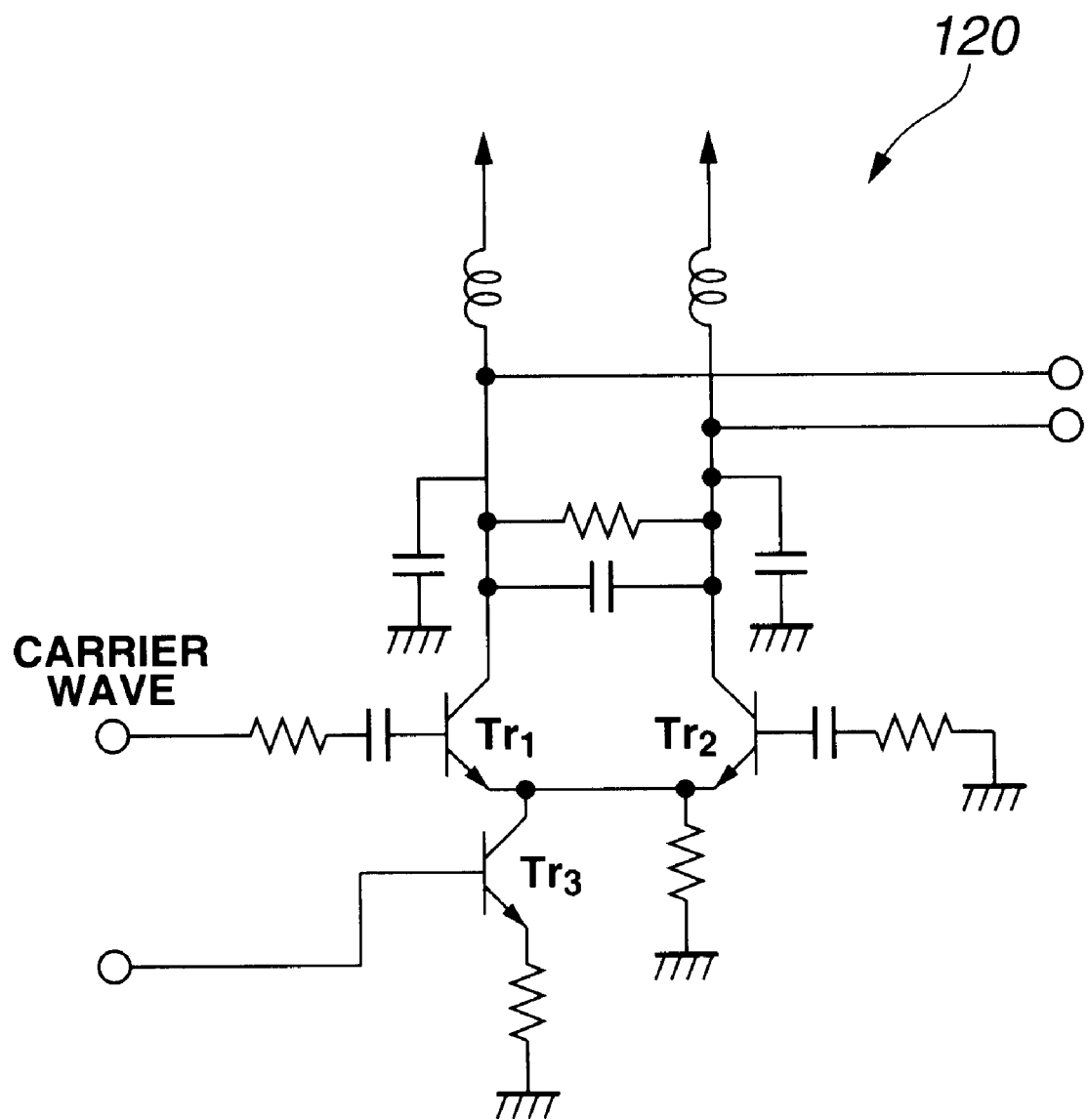
FIG. 22 is a circuit diagram showing a specified structure of a modulation unit and an amplifier constituting the transmission/reception unit.

In view of the actual use state of the tape cartridge 1, the auxiliary storage medium 31 is not provided with an enclosed battery, such that the power for operating the respective circuits is routed from the recording and/or reproducing apparatus 60. That is, for feeding the auxiliary storage medium 31 of the tape cartridge 1 with power, the transmission/reception unit 108 feeds the auxiliary storage medium 31 with power in accordance with the non-contact system of overlaying the modulated signal and the power to transmit the overlaid signal. In more detail, if amplitude modulation is used as a pre-set modulation system, the modulator 112 and the amplifier 113 are made up of a sole amplitude modulation and amplification circuit 120, as shown in FIG. 22, with the amplitude modulation and amplification circuit 120 being made up of a differential amplification circuit comprised of transistors $Tr_1$, $Tr_2$. One of the inputs of the differential amplification circuit, that is the base of the transistor $Tr_1$, is fed with the carrier wave, with the other input, that is the base of the transistor $Tr_2$, being grounded in an AC fashion through a capacitor and a resistor. Across a junction of two emitters of the transistors $Tr_1$, $Tr_2$ and a grounding point is connected a transistor $Tr_3$, the base of which is fed with data from the interfacing circuit 111. The amplitude modulation and amplification circuit 120 amplitude-modulates the carrier oscillator carrier, not shown, with data by the transistor $Tr_3$, whilst the produced modulated signal is amplified by the transistors $Tr_1$, $Tr_2$. The present invention is not limited to this illustrative embodiment, and a variety of modulation systems, such as PSK modulation or QAM modulation, for example, may be used as the modulation system. The antenna 109 transmits the data to the transmission/reception unit 40 of the auxiliary storage medium 31 provided on the tape cartridge 1. If the data is received by the antenna 37 of the auxiliary storage medium 31, the rectifier circuit 48 of the transmission/reception unit 40 full-wave rectifies and smooths the reception signals to generate a DC voltage required by the auxiliary storage medium 31 to feed the voltage to respective recording and/or reproducing circuits of the auxiliary storage medium 31, as shown in FIG. 9.

The wiring substrate 107 is provided with a power source unit 121 for supplying the power to the auxiliary storage medium of the tape cartridge when the tape cartridge having the contact point terminals is loaded on the auxiliary storage medium. The power source unit 121 feeds the power to the to the respective electrical circuits of the recording and/or reproducing apparatus, while feeding the power to the auxiliary storage medium of a conventional tape cartridge through the contact point terminals 106.

When the tape cartridge 1 has been moved to the loading position by the holder movement actuating mechanism 66 as will be explained subsequently in detail, the auxiliary recording and/or reproducing mechanism 101 faces the auxiliary storage medium 31 of the tape cartridge 1, such that the auxiliary recording and/or reproducing mechanism 101 is now able to transmit/receive the recording medium information with the auxiliary storage medium 31 of the tape cartridge 1 or with the auxiliary storage medium of the tape cartridge comprising the conventional auxiliary storage medium provided with the contact point terminals. The auxiliary recording and/or reproducing mechanism 101, having the transmission/reception unit 108 and the contact terminal 106, is able not only to exchange signals with the auxiliary storage medium 31 of the tape cartridge 1, but also to exchange signals with the auxiliary storage medium of the conventional tape cartridge.

Figure 23:
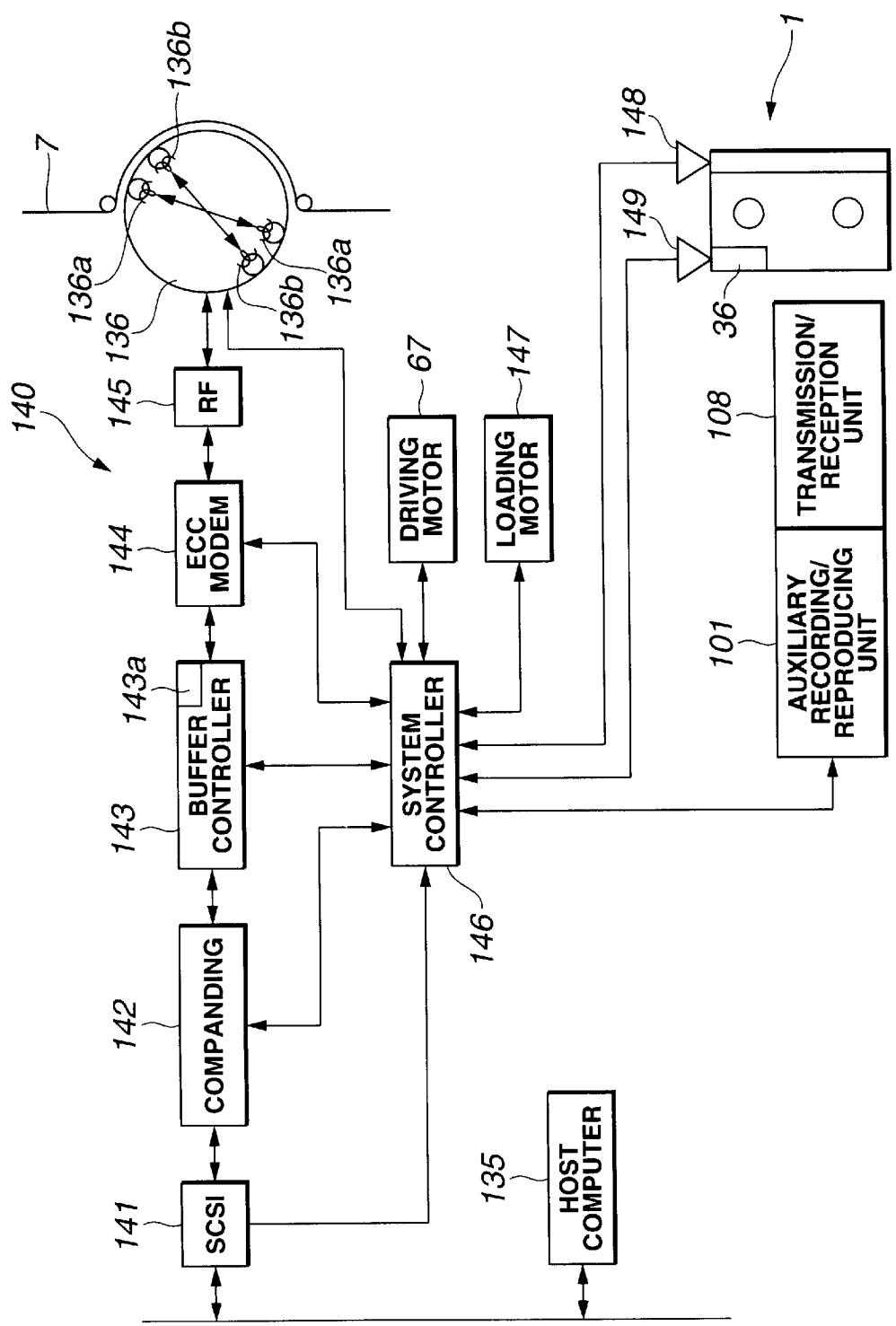
FIG. 23 is a block diagram showing a controller of the recording and/or reproducing apparatus.

Meanwhile, if the recording medium information is read out by the auxiliary recording and/or reproducing mechanism 101 by the auxiliary storage medium 31 of the tape cartridge 1, the magnetic tape 7, extended through the recess 13 of the tape cartridge 1, is wound in position by a loading mechanism in a rotary magnetic head device, as shown in FIG. 23. The magnetic tape 7, wound in position in the rotary magnetic head device 136, is run in sliding contact with the rotary magnetic head device 136. The rotary magnetic head device 136, adapted for recording and/or reproducing information signals, includes a tape guide drum 138, made up of a rotary drum, carrying a magnetic head 137, and a stationary drum 138, mounted on the underside of the rotary drum coaxially therewith. The tape guide drum 138 is run in rotation by a driving motor, arranged on the underside of the tape guide drum 138, to run the magnetic head 137 in rotation. The magnetic head 137, mounted on the rotary drum, is made up of a pair of recording heads 137a, 137a, adapted for recording information signals on the magnetic tape 7, and a pair of playback heads 137b, 137b adapted for reproducing the information signals recorded on the magnetic tape 7. In this rotary magnetic head device 136, the magnetic tape 7 is run obliquely at a pre-set angle. In the vicinity of the rotary magnetic head device 136, there is arranged a cleaning head 139, which is kept in sliding contact with the running magnetic tape 7 to wipe off impurities affixed to the surface of the magnetic tape 7, such as dust and dirt or fingerprints. The recording and/or reproducing apparatus 60 is supervised by a controller 140, as now explained, to record information signals on the magnetic tape 7 by the rotary magnetic head device 136 and to reproduce information signals recorded on the magnetic tape 7.

Referring to FIG. 23, the controller 140 includes an SCSI interface 141, for inputting/outputting information signals, a companding circuit 142 for companding the information signals inputted from the SCSI interface 141, and a buffer controller 143 for transiently storing the signals from the companding circuit 142. The controller 140 also includes an ECC modem circuit 144 for appending error correction codes to signals supplied from the buffer controller 143 and for doing modulation/demodulation, and an RF amplifier 145 for amplifying signals from the ECC modem circuit 144 for routing the amplified signals to the rotary magnetic head device 136.

The SCSI interface 141 is fed with data signals from an external equipment, such as a host computer 135. The SCSI interface 141 routes the input signal to the companding circuit 142. The SCSI interface 141 routes signals from the companding circuit 142 to an external equipment, such as a host computer 135.

The companding circuit 142 compresses signals supplied thereto from the SCSI interface 14, while expanding signals from the buffer controller 143. If the signals supplied from the SCSI interface 141 are already compressed, the companding circuit 142 routes the signals supplied from the SCSI interface 141 to the buffer controller 143 without compression. On the other hand, if there is no necessity of expanding signals routed to the SCSI interface 141, the companding circuit 142 routes the signals from the buffer controller 143 to the SCSI interface 141 without performing the signal compression. These settings for not performing the compression/expansion may be previously set by the user or referred to by the system controller which will be explained subsequently.

The buffer controller 143 causes the compressed signals from the companding circuit 142 or the signals from the ECC modem circuit 144 to be temporarily stored in the buffer memory 143a. The ECC modem circuit 144 appends error correction codes to the data in the buffer controller 143, while modulating the data in meeting with magnetic recording to route the data to an RF amplifier 145. The RF amplifier 145 amplifies signals from the ECC modem circuit 144 to route the amplified signals to the magnetic head 137.

The controller 140 includes a system controller 146 adapted for controlling the entire apparatus. The system controller 146 controls the SCSI interface 141, companding circuit 142, buffer controller 143, ECC modem circuit 144 and the RF amplifier 145, while also controlling the driving motor 64 constituting the aforementioned holder movement actuating mechanism 66. That is, if a detection circuit 148 detects that the tape cartridge 1 has been loaded on the cartridge holder 61, detection signals are routed from the detection circuit 148 to the system controller 146 to drive a driving motor 65. If a detection circuit 149 detects that the tape cartridge 1 has been transported to the loading position, the detection signal is supplied by the detection circuit 149 to halt the driving motor 65.

The system controller 146 also controls a loading motor 147 constituting a loading mechanism operating for loading the magnetic tape 7 from the tape cartridge 1 lying at the loading position. If the tape cartridge 1 is at the loading position, and the user performs the recording or reproducing operation, the system controller 146 causes the loading motor 147 to be loaded in position and placed around the tape guide drum 138. The system controller 146 drives the driving motor constituting the rotary magnetic head device 136 to run the rotary magnetic head device 136 in rotation.

The system controller 146, controlling the aforementioned auxiliary recording and/or reproducing mechanism 101, is fed with the recording medium information from the auxiliary recording and/or reproducing mechanism 101. The system controller 146 drives the auxiliary recording and/or reproducing mechanism 101 when the tape cartridge is at the loading position. That is, when the tape cartridge 1 is loaded in position, and the motor driving circuit 147 is driven for pulling out the magnetic tape 7 from the main cartridge body unit 4, the system controller 146 drives the auxiliary recording and/or reproducing mechanism 101. If the readout of the recording medium information comes to a close, and the loading of the magnetic tape 7 also comes to a close, the system controller 146 controls the rotary magnetic head device 136 based on the recording medium information from the auxiliary recording and/or reproducing mechanism 101. For example, if the number of times of replay of the magnetic tape 7 constituting the recording medium information exceeds a pre-set value, the system controller 146 causes the magnetic tape 7 to be cleaned by a cleaning head 139 provided in proximity to the rotary magnetic head device 136. If the recording or replay comes to a close, the system controller 146 updates the recording medium information, during the unloading operation of accommodating the magnetic tape 7 placed in position in the rotary magnetic head device 136 in the main cartridge body unit 4, to route the updated recording medium information to the auxiliary recording and/or reproducing mechanism 101. Since the system controller 146 performs readout or updating of the recording medium information during the loading or unloading of the magnetic tape 7, it is possible to shorten the time until recording and/or reproduction.

If the system controller 146 detects the loading of the tape cartridge 1 in the cartridge holder 61, the controller 140 actuates the driving motor 65 to operate the holder movement actuating mechanism 66 to cause the holder movement actuating mechanism 66 to move the tape cartridge 1 to the loading position. If the tape cartridge 1 has been moved to the loading position, the system controller 146 causes the recording medium information to be read out from the auxiliary storage medium 31 of the tape cartridge 1. If the recording and/or reproduction is executed, the system controller 146 drives the loading motor 147 to put the magnetic tape 7 in position in the rotary magnetic head device 136, by the loading mechanism, to run the tape guide drum in rotation. At this time, the system controller 146 controls the rotary magnetic head device 136 etc. based on the recording medium information read out from the auxiliary storage medium 31.

The information signals, inputted from the host computer 135 through the SCSI interface 141, are compressed in the companding circuit 142 and thence routed to the buffer controller 143. The signals stored in the buffer controller 143 are supplied to the ECC modem circuit 144 where the error correction codes are appended for modulation. The resulting signals are routed to recording heads 137a, 137a of the magnetic head 137, through the RF amplifier 145, where a magnetic field is applied to the magnetic tape 7 to recording the information signals.

When reading out the information signals recorded on the magnetic tape 7, the information signals are read out through the playback heads 137b, 137b and amplified by the RF amplifier 145. The resulting signals are demodulated and corrected for errors in the ECC modem circuit 144. The resulting signals are transiently stored in the buffer controller 143 and expanded in the companding circuit 142 so as to be routed over the SCSI interface 141 to the host computer 135.

If the number of times of replay of the magnetic tape 7 constituting the recording medium information exceeds a preferred embodiment-set number of times, the system controller 146 causes the cleaning head 139 to clean the magnetic tape 7.

When the tape cartridge 1 is to be taken out from the recording and/or reproducing apparatus 60, the system controller 146 first causes the loading motor 147 to be driven to cause the loading mechanism to accommodate the magnetic tape 7 put in place in the rotary magnetic head device 136 in the main cartridge body unit 4. When the loading of the magnetic tape 7 comes to a close, the system controller 146 actuates the driving motor 65 to cause the holder movement actuating mechanism 66 to transport the tape cartridge 1 to the take-out position.

When the tape cartridge 1 is loaded on the cartridge loading unit 99 of the recording and/or reproducing apparatus 60, the tape cartridge 1 is introduced into the cartridge holder 61, with the lid side as an intruding end. At this time, the tape cartridge 1 is intruded until its forward edge compresses against the abutment pieces 73, 73. The tape cartridge 1 is held in position in readiness for being intruded into the cartridge holder 61. At this time, the tape cartridge 1 is thrust and supported by a spring plate 94 provided on the ceiling plate 93 of the cartridge holder 61.

When the tape cartridge is intruded into the cartridge holder 61, the lid 10 is unlocked by the lid unlock piece. The lid is enabled to be rotated against the force of bias of the biasing member.

If the insertion and holding of the tape cartridge 1 by the cartridge holder 61 is detected by the detection element 148 shown in FIG. 23, the driving motor 65 starts to run in the forward direction. If the driving motor 65 is run in this manner, the driving power of the motor is transmitted to the limiter plate 78 engaged with the driving gear 86. Since the limiter plate 78 is connected through the limiter spring 77 to the slide plate 75, the slide plate is slid towards the inside of the main body portion of the apparatus, in unison with the limiter plate 78, in the direction indicated by arrow P in FIG. 16. The other slide plate 76, connected to the slide plate 75 through the driving power transmission shaft 85, is slid in synchronism in the direction indicated by arrow P in FIG. 16.

Figure 24:
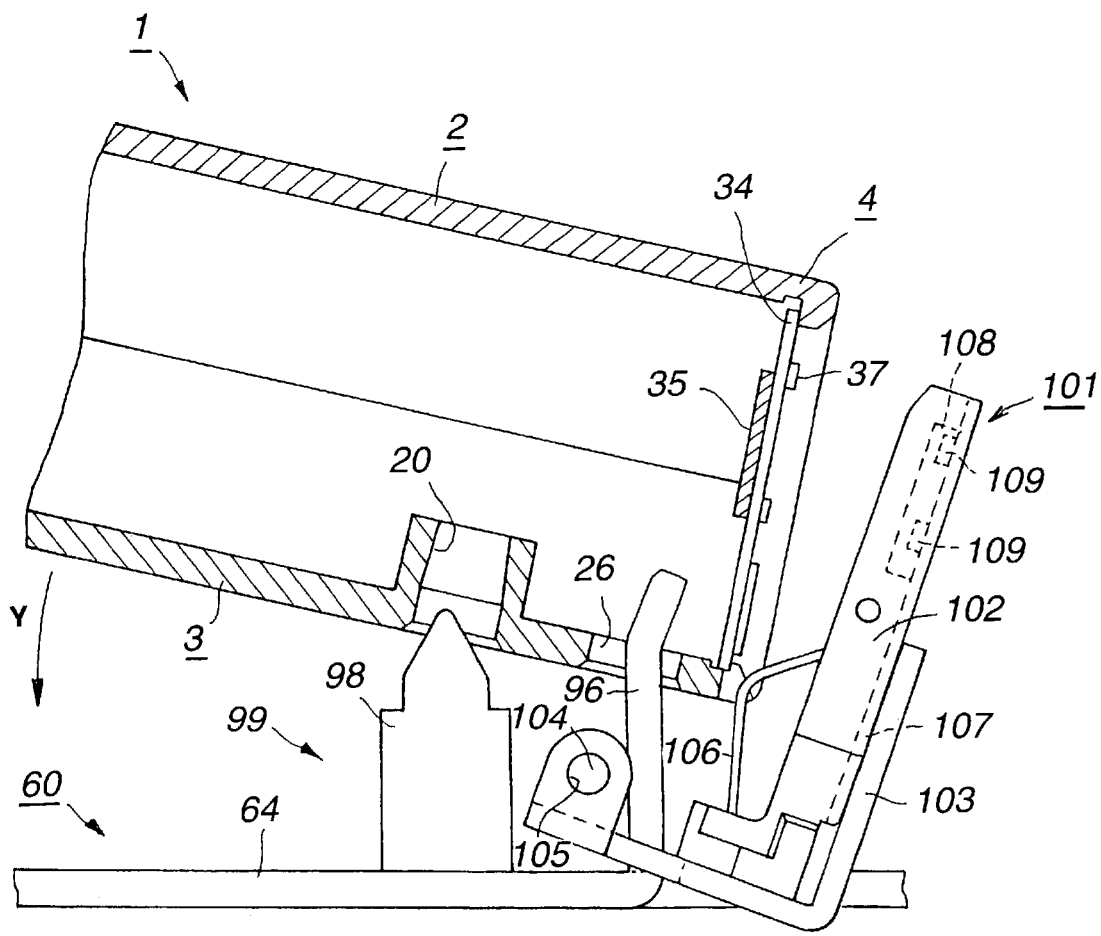
FIG. 24 is a schematic cross-sectional view for illustrating the operation of loading the tape cartridge on the recording and/or reproducing apparatus.

If the paired slide plates 75, 76 are slid in the direction indicated by arrow P in FIG. 16, the cartridge holder 61 is moved in the direction indicated by arrow P in FIG. 16, by the slide guide pins 67, 68 being guided by the slide guide grooves 69, 70. If the cartridge holder 61 is moved in the direction indicated by arrow P in FIG. 16, the other slide guide pin 68 is guided by a cam grove 92 provided in the slide plate 75, so that the cartridge holder 61 is moved upwards under guidance by the inclined guide groove 70a of the opposite side slide guide groove 70. At this time, the slide guide pin 67 is positioned in the horizontal guide groove 69a of the slide guide groove 69 and hence is moved in the horizontal direction. Thus, the cartridge holder 61 is pivoted so that its forward end is raised about the slide guide groove 69 as the center of rotation. The tape cartridge 1, held by the cartridge holder 61, is moved in the horizontal direction as indicated by arrow P in FIG. 16, and is then rotated so that its lower end on the back surface side is lowered towards the bottom plate 71 of the chassis 64 as indicated by arrow Y in FIG. 24. At this time, the distal ends of the positioning pin 98 and the cartridge discriminating piece 96 are intruded into the positioning hole and the discriminating hole 26 formed in the tape cartridge 1, respectively.

Figure 25:
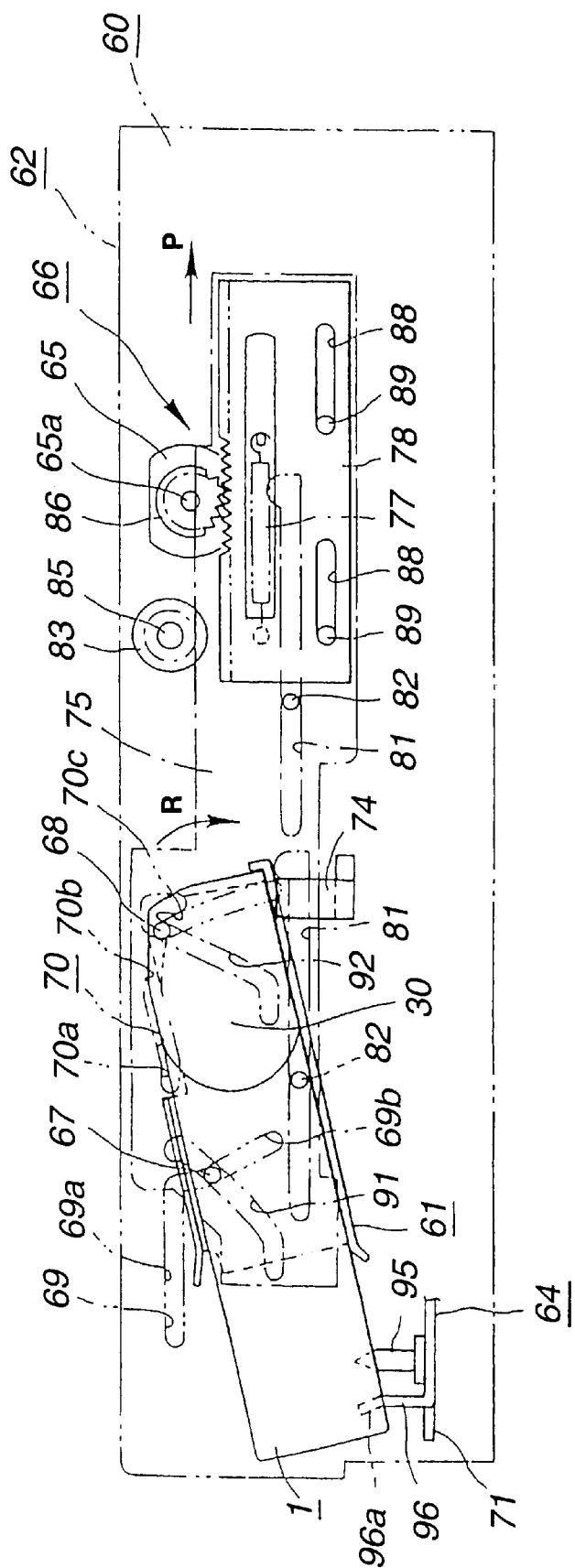
FIG. 25 is a side view of a cartridge loading apparatus showing the state in which the cartridge holder is tilted as it is moved towards the cartridge loading position.

If the driving motor 65 is driven so that the paired slide plates 75, 76 are slid in the direction indicated by arrow P in FIG. 16, the slide guide pin 67, intruded into the slide guide groove 69, gets to the inclined guide groove 69b, from the horizontal guide groove 69a, as shown in FIG. 25, so as to be moved by the guide groove 91 provided in the slide plate 75, such that the slide guide pin 67 is lowered towards the bottom plate 71 of the chassis 64, under guidance by the inclined guide groove 69b. At this time, the opposite side slide guide pin 68 is positioned in an area from the horizontal guide groove 70b to the inclined guide groove 70c, so that the cartridge holder 61 is pivoted, about the other slide guide pin 68 as center, so that the rear end of the cartridge holder 61 is lowered. The positioning pin 98 is intruded into the positioning hole 20 provided in the tape cartridge 1, whilst the cartridge discriminating piece 96 is intruded into the discriminating hole 26, as shown in FIG. 25. At this time, the tape cartridge 1, held by the cartridge bolder 61, is rotated so that its lower back surface end descends towards the bottom plate 71 of the chassis 64 in the direction indicated by arrow Y in FIG. 25. Since the distal end of the cartridge discriminating piece 96 is an inclined portion 96a which is inclined along the locus of movement of the tape cartridge 1, the cartridge discriminating piece 96 is smoothly intruded into the cartridge discriminating hole 26 along the path of movement of the tape cartridge 1.

Figure 26:
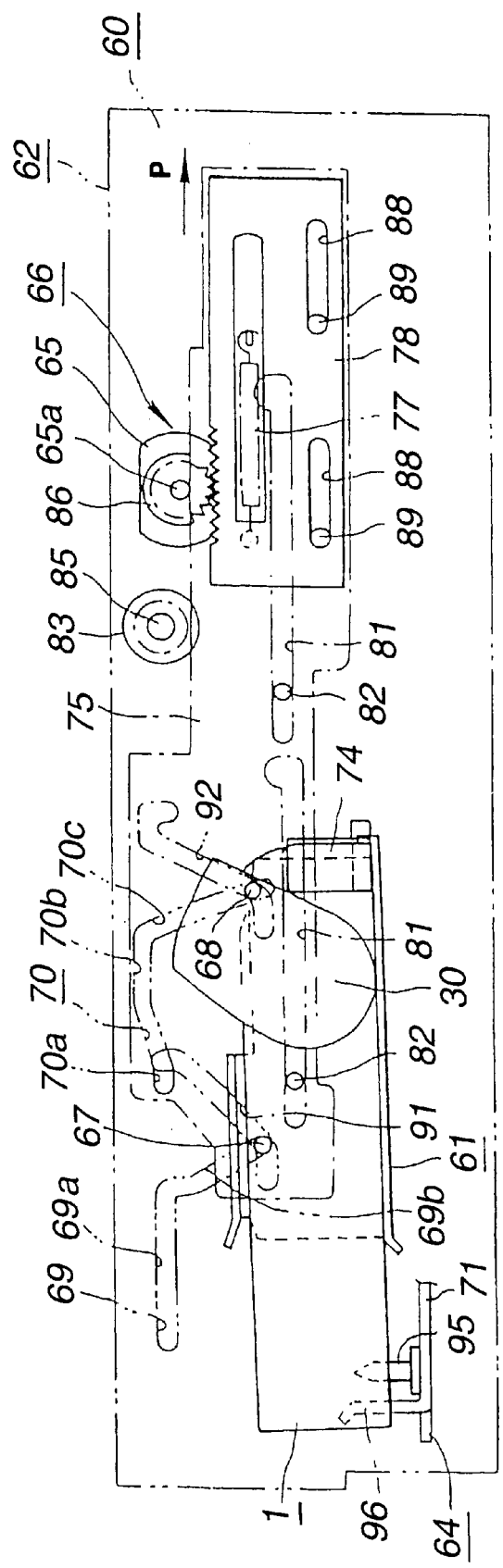
FIG. 26 is a side view of the cartridge loading device showing the state in which the cartridge holder is loaded in a substantially horizontal state on the cartridge loading unit.

If the driving motor 65 is further driven from the state shown in FIG. 25, such that the paired slide plates 75, 76 are slid in the direction indicated by arrow P in FIG. 25, the slide guide pins 67, 68 are moved along cam grooves 91, 92, as shown in FIG. 26, so as to be lowered towards the bottom plate 71 of the chassis 64, under guidance by the inclined guide grooves 69c, 70c, extending towards the lower sides of the slide guide grooves 69, 70. Since the cartridge holder 61 descends from the state in which the forward end thereof is inclined upwards, as shown in FIGS. 25 and 26, the cartridge holder 61 is lowered so as to be rotated in the direction indicated by arrow R in FIG. 25, about the slide guide pin 67 as the center of rotation.

When the cartridge holder 61 is lowered so as to be rotated in the direction indicated by arrow R in FIG. 25, the lower edge of the lid 10 of the tape cartridge 1 compresses against the lid opening member 74. As the cartridge holder 61 is lowered, the lid 10 is thrust by the lid opening member 74 and hence is rotated against the bias of the biasing member to open the front surface of the main cartridge body unit 4. Since the tape cartridge 1 is lowered at the same time as it is rotated against the bias of the biasing member, the lid 10, rotationally mounted on the main cartridge body unit 4, can be positively rotated by the stationary lid opening member 74.

Also, when the cartridge holder 61 is lowered at the same time as it is rotated in the direction indicated by arrow R in FIG. 25, the reel unlock member 95 is intruded into the reel lock member actuating opening 21 provided in the bottom surface of the tape cartridge 1, as shown in FIG. 26, to release the lock of the tape reels 5, 6 by the reel lock mechanism to enable the rotation of the tape reels 5, 6.

Figure 27:
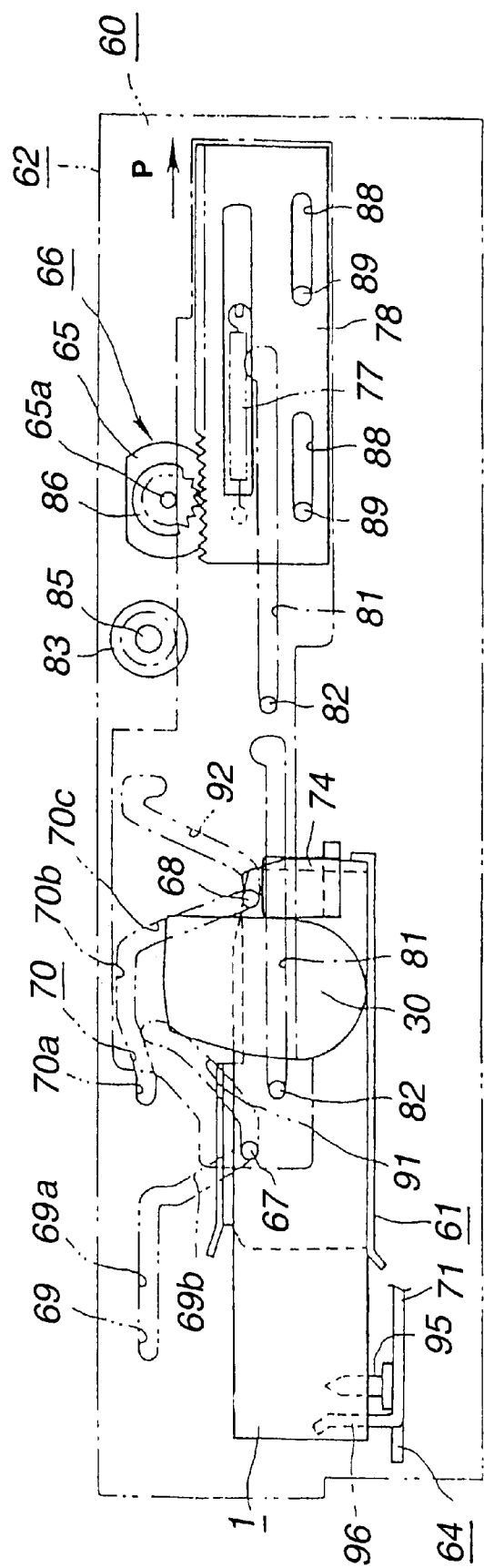
FIG. 27 is a side view showing the state in which the tape cartridge has been loaded on the cartridge loading unit.
Figure 28:
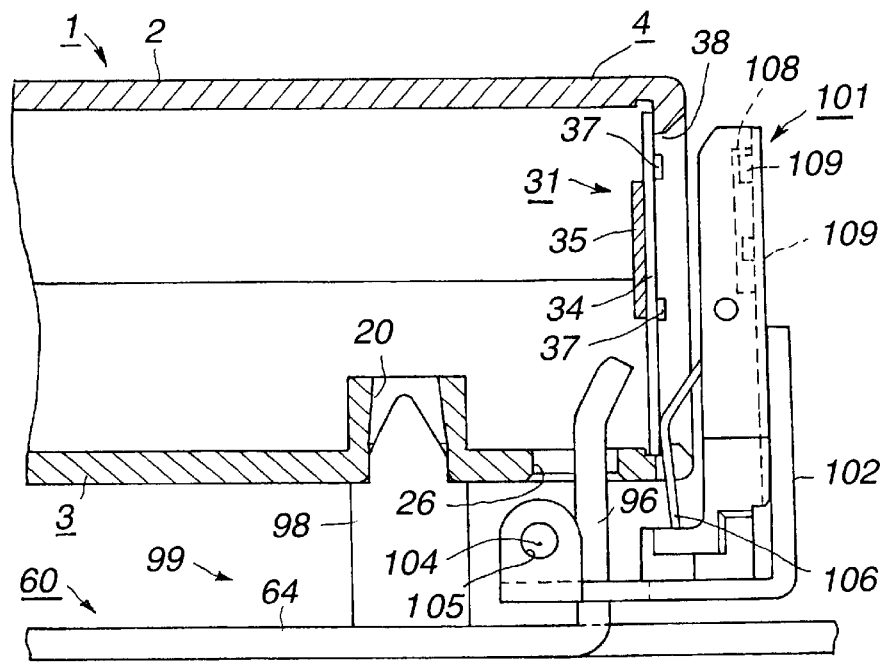
FIG. 28 is a schematic cross-sectional view of the cartridge loading device showing the state in which the cartridge holder is tilted as it is moved towards the cartridge loading position.

If the driving motor 65 is further driven forward, such that the slide plates 74, 75 are slid in the direction indicated by arrow P in FIG. 26, the cartridge holder 61 is lowered to the lowermost position, as shown in FIG. 27, and is loaded on the cartridge loading unit 99, as the tape cartridge 1 is supported in position by the height setting pins 97, 97 and the positioning pins 98, 98. At this time, the cartridge discriminating piece 96 is intruded into the inside of the main cartridge body unit 4 through the discriminating hole 26.

When the cartridge holder 61 has been lowered to the cartridge loading unit 99, the lid 10 of the tape cartridge 1 is rotated to the position of fully opening the front surface of the main cartridge body unit 4 by the lid opening member 74.

When the tape cartridge 1 is transported to the loading position, the detection element 149 detects that the tape cartridge 1 is in the loading position to route the detection signals to the system controller 146. When the tape cartridge 1 is loaded on the cartridge loading unit 99 provided on the recording and/or reproducing apparatus 60, the loading mechanism provided on the recording and/or reproducing apparatus 60 is intruded into the loading recess 13 provided in the front surface of the main cartridge body unit 4 to pull out the magnetic tape 7 from the main cartridge body unit 4 to load it on a pre-set tape running path.

At this time, the antenna 109, constituting the transmission/reception unit 108 of the auxiliary recording and/or reproducing mechanism 101, faces the antenna 37 of the transmission/reception unit 40 of the auxiliary storage medium 31 of the tape cartridge 1, loaded in position, to permit transmission/reception of the recording medium information in a non-contact fashion. If the tape cartridge loaded is one comprising an auxiliary storage medium provided with the contact point terminals, the contact point terminals of the auxiliary storage medium of the tape cartridge are contacted with the contact point terminals 106 of the auxiliary recording and/or reproducing mechanism 101 of the recording and/or reproducing apparatus 60 to permit transmission/reception of the recording medium information.

Figure 29:
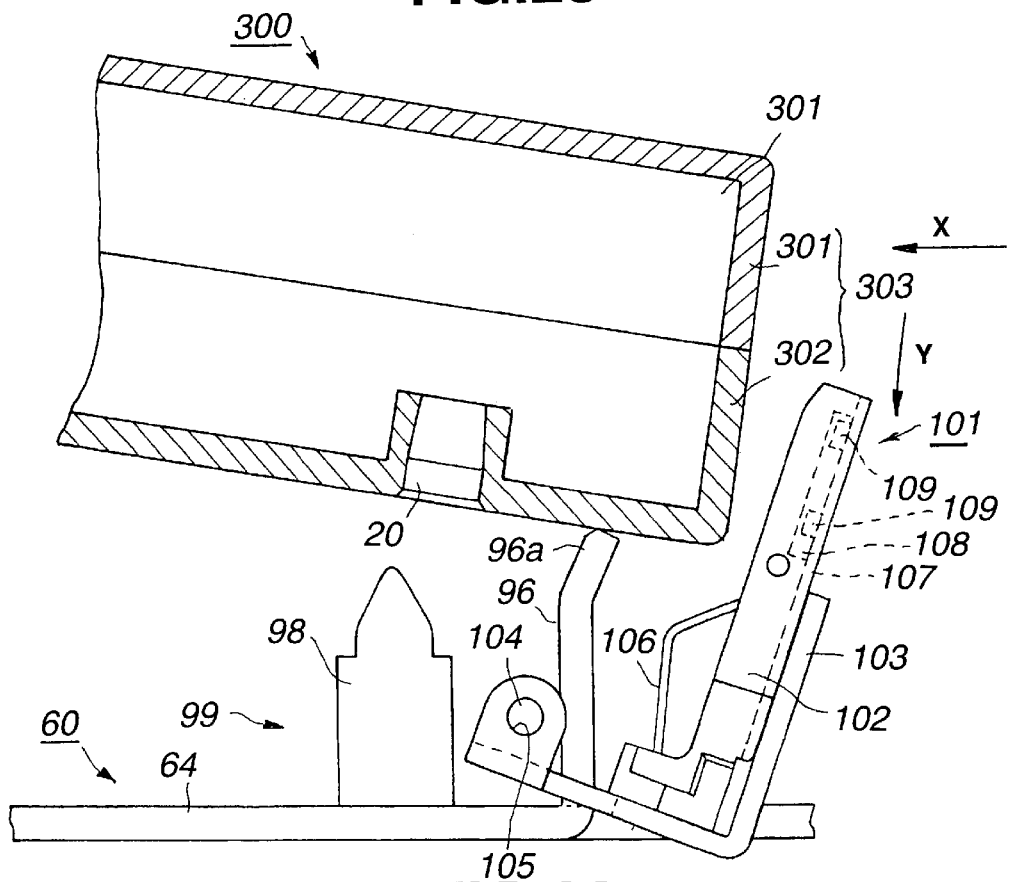
FIG. 29 is a schematic cross-sectional view for illustrating the state of inadvertent loading of the tape cartridge.

Meanwhile, if a tape cartridge 100, not having the discriminating hole 26, used exclusively for recording video or audio signals, is loaded in the recording and/or reproducing apparatus 60 provided with the cartridge discriminating piece 96 as shown in FIG. 29, the cartridge holder 61 is moved in the direction indicated by arrow P in FIG. 16. If the tape cartridge 300, held by the cartridge holder 61, is moved in the horizontal direction, as indicated by arrow X in FIG. 29, and subsequently rotted as it is lowered towards the bottom plate 71 of the chassis 64, as indicated by arrow Y in FIG. 29, the distal end of the cartridge discriminating piece 96 compresses against the bottom surface of a main cartridge body unit 301. The tape cartridge 300 is prohibited from being lowered further and from being loaded on the cartridge loading unit 99.

Meanwhile, the system controller 146, shown in FIG. 23, controls the recording and/or reproducing apparatus 60, since the time of insertion of the tape cartridge through the insertion/ejection opening of the recording and/or reproducing apparatus 60 until recording and/or reproduction of the magnetic tape 7, in the following manner. That is, if, at step S1 in FIGS. 23 and 30, the tape cartridge 1 is inserted through the insertion/ejection opening of the tape cartridge 1 of the recording and/or reproducing apparatus, the system controller 146 at step S2 verifies whether or not the tape cartridge 1 has been held by the cartridge holder 61. That is, if the system controller 146 detects that the detection element 148 provided in the vicinity of the insertion/ejection opening of the recording and/or reproducing apparatus 60 is held by the cartridge holder 61, and the corresponding detection signal is routed to the system controller 146, the latter advances to step S3. If this detection signal is not furnished, the processing of step S2 is repeated.

The system controller 146 at step S3 drives the driving motor 65 of the holder movement actuating mechanism 66 to transport the tape cartridge 1 by the holder movement actuating mechanism 66 from the insertion/ejection position of insertion/ejection of the tape cartridge 1 to the loading position of lading the tape cartridge 1, in a manner as described above.

The system controller 146 at step S4 verifies whether or not the tape cartridge 1 has been moved to the loading position. That is, if the detection element 149 provided in the vicinity of the loading position of the tape cartridge 1 detects that the tape cartridge 1 has been transported to the loading position, and the corresponding detection signal is sent to the system controller 146, the system controller advances to steps S5 and S6. If the detection signal is not furnished, the processing of step S4 is repeated. Meanwhile, if the tape cartridge loaded on the recording and/or reproducing apparatus 60 provided with the cartridge discriminating piece 96 is the tape cartridge 300 not having the discriminating hole 26 and which is used exclusively for recording audio or video signals, the distal end of the cartridge discriminating piece 96 compresses against the bottom surface of the main cartridge body unit 301. Thus, the system controller 146 reverses the operation of the driving motor 65 to eject the tape cartridge 300 from the recording and/or reproducing apparatus 60.

The system controller 146 causes the recording medium information to be read out at step S5. That is, a command for reading out the recording medium information from the transmission/reception unit 108 of the auxiliary recording and/or reproducing mechanism 101 of the recording and/or reproducing apparatus 60 is routed to the auxiliary storage medium 31 of the tape cartridge 1, as shown in FIGS. 9 and 21. Based on this command, the control circuit 44 of the auxiliary storage medium 31 of the tape cartridge 1 reads out the necessary data from the memory 45 to furnish it to the modulator 46. The modulator then modulates the carrier with the read-out data to route the modulated signal to the amplifier 47. The amplifier amplifies the modulated signal to drive the antenna 37 to transmit the recording medium information to the transmission/reception unit 108 of the auxiliary recording and/or reproducing mechanism 101 provided on the recording and/or reproducing apparatus. The antenna 109 provided on the recording and/or reproducing apparatus 60 routes the received recording medium information through the protection circuit 114 to the amplifier 115. The amplifier amplifies this reception signal to route the amplified signal to the demodulator 116. The demodulator detects the amplified reception signal to reproduce the recording medium information to route the information through the interfacing circuit 111 to the CPU 110 and then to the system controller 146.

If the tape cartridge loaded is a conventional one including an auxiliary storage medium carrying the contact point terminals, the recording medium information stored in the auxiliary storage medium of the conventional tape cartridge is transmitted through the contact point terminals 106 of the auxiliary recording and/or reproducing mechanism 101.

Figure 30:
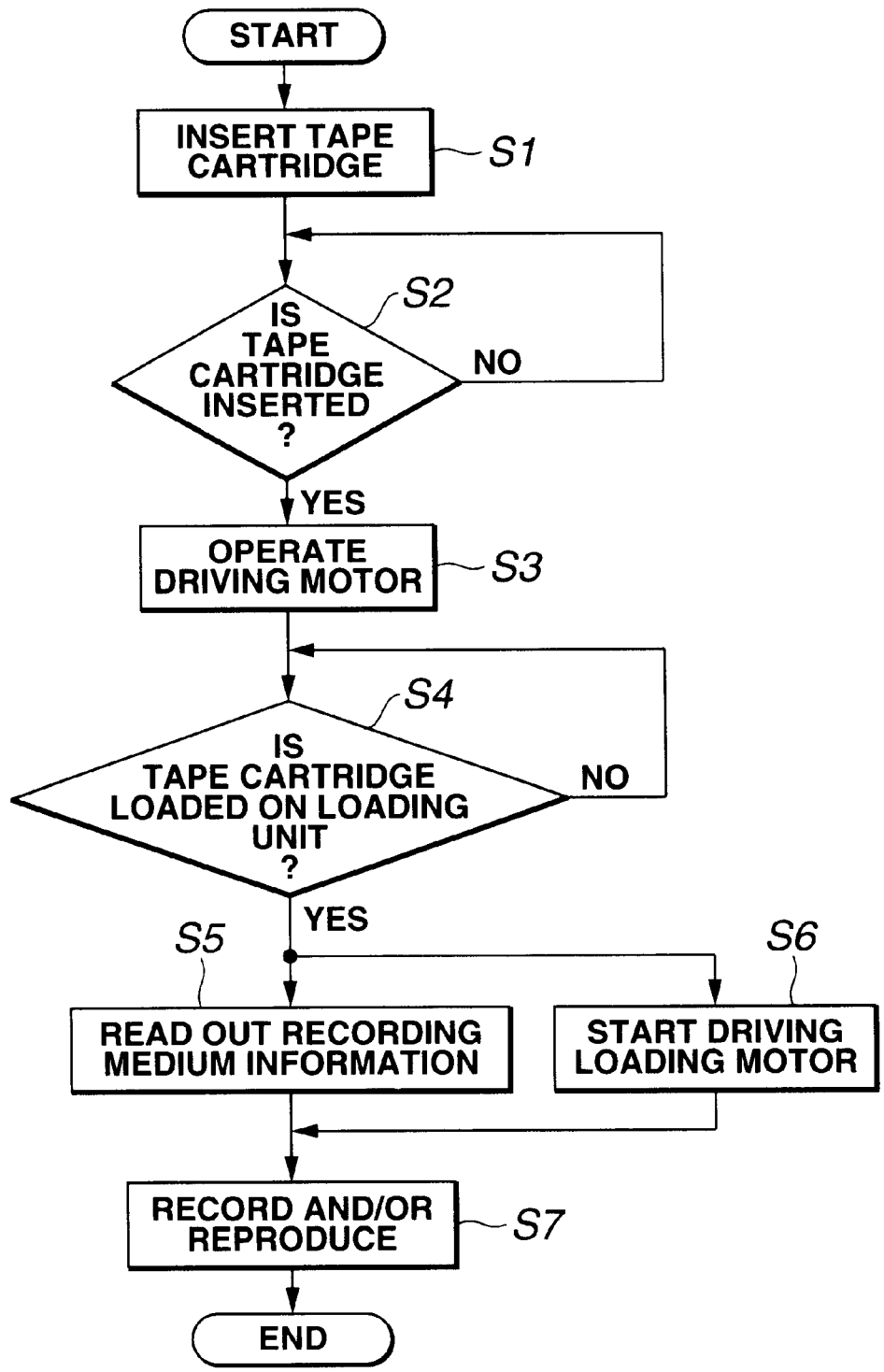
FIG. 30 is a flowchart for illustrating the operation as from insertion of the tape cartridge until recording and/or reproduction.
Figure 31:
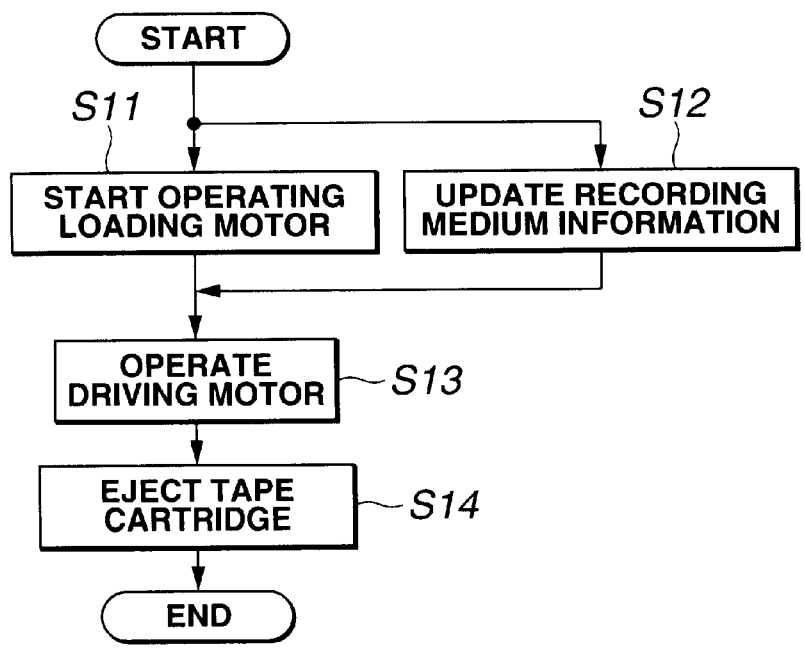
FIG. 31 is a flowchart for illustrating the operation until ejection of the tape cartridge.
Figure 32:
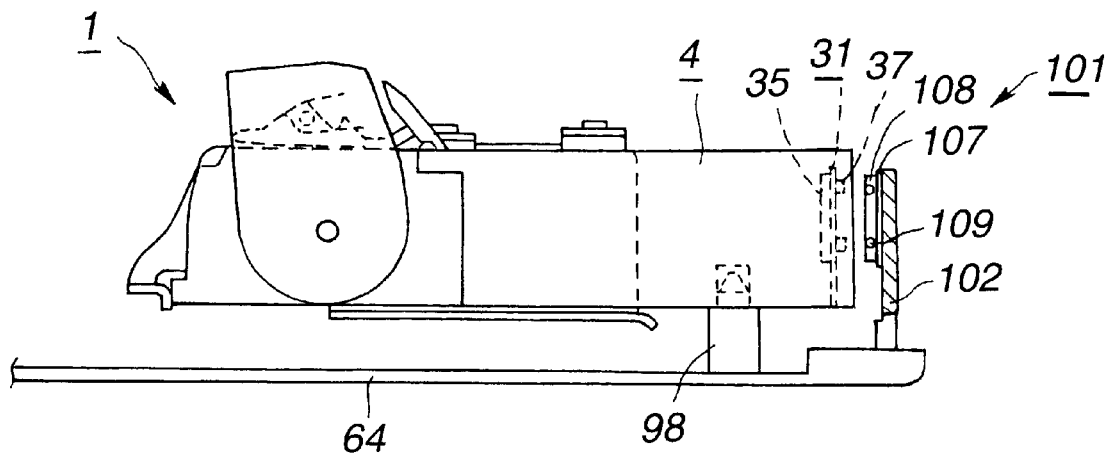
FIG. 32 is a side view showing another embodiment of the auxiliary recording and/or reproducing mechanism.

Simultaneously, the system controller 146 at step S6 drives the loading motor 147, constituting the loading mechanism, loading the magnetic tape 7 from the tape cartridge 1 at the loaded position, to cause the loading mechanism to load the magnetic tape 7 to wind it around the tape guide drum 138, as shown in FIG. 30.

The system controller 146 at step S7 drives the rotary magnetic head device 136 to record the information signals on the magnetic tape 7 and to reproduce the information signals recorded on the magnetic tape 7. That is, if the information signals are recorded on the magnetic tape 7, the information signals inputted from the host computer 135 through the SCSI interface 141 are compressed by the companding circuit 142 and then supplied to the buffer controller 143, as shown in FIG. 23. The signals stored in the buffer controller 143 are routed to the ECC modem circuit 144 for appendage of error correction codes and modulation. The modulated signals are sent through the RF amplifier 145 to the magnetic heads 137a, 137a, making up the magnetic head 137, where the magnetic field is applied to the magnetic tape 7 to record the information signals.

In reproducing the information signals recorded on the magnetic tape 7, information signals are read out through the playback heads 137b, 137b so as to be amplified by the RF amplifier 145. The amplified signals are demodulated by the ECC modern circuit 144 for error correction. The error-corrected signals are transiently stored in the buffer controller 143 and expanded by the companding circuit 142 so as to be supplied through the SCSI interface 141 to the host computer 135.

If the number of times of replay of the magnetic tape 7 constituting the recording medium information exceeds a pre-set value, the system controller 146 causes the cleaning head 139 to clean the magnetic tape 7, based on the recording medium information read out from the auxiliary storage medium 31 of the tape cartridge 1.

When ejecting the tape cartridge 1 loaded on the cartridge holder 61, the system controller 146 controls the recording and/or reproducing apparatus 60 in the following manner. That is, the system controller 146 at step S11 drives the loading motor 147 to cause the loading mechanism to accommodate the magnetic tape, arranged in position in the rotary magnetic head device 136, in the main cartridge body unit 4.

The system controller 146 at step S12 updates the recording medium information read out to the system controller 146, based on the results of recording and/or reproduction of the magnetic tape 7. Specifically, the recording medium information is updated as to the number of times of recording or reproduction and the contents newly recorded on the magnetic tape 7.

The system controller 146 at step S12 transmits the recording medium information updated in the auxiliary storage medium 31 of the tape cartridge 1. Specifically, the system controller 146 feeds the updated recording medium information to the CPU 110. The CPU then routes the updated recording medium information through the interfacing circuit 111 to the modulator 112 which then modulates the carrier with the recording medium information in accordance with a pre-set modulation system to route the resulting modulated signal to the amplifier 113. The amplifier amplifies the modulated signals to drive the antenna 109. The antenna 37 of the auxiliary storage medium 31 of the tape cartridge 1 routes the reception signal through the protection circuit 41 to the amplifier 42, which then amplifies the reception signal to route the amplified reception signal to the demodulator 43. The modulator performs control of memorizing the recording medium information in the memory 45 to update the recording medium information.

If the loaded tape cartridge is a conventional tape cartridge having an auxiliary storage medium carrying contact point terminals, the updated recording medium information is transmitted to the auxiliary storage medium of the tape cartridge through the contact point terminals 106 of the auxiliary recording and/or reproducing mechanism 101.

When the updating of the recording medium information comes to a close, the system controller 146 at step S13 drives the driving motor 65 of the holder movement actuating mechanism 66 to actuate the holder movement actuating mechanism 66 to transport the tape cartridge 1 to the ejecting position. The tape cartridge 1, transported to the insertion/ejection opening of the recording and/or reproducing apparatus 60, is taken out at step Shutter member 14 by the user.

With the above-described recording and/or reproducing apparatus 60, in which, when the auxiliary recording and/or reproducing mechanism 101 is moved by the holder movement actuating mechanism 66 to the tape cartridge loading position, it faces the auxiliary storage medium 31 of the tape cartridge 1, the recording medium information can be transmitted/received reliably. Also, since the auxiliary recording and/or reproducing mechanism 101 has the transmission/reception unit 108 for transmitting/receiving the recording medium information over the radio path, and the contact point terminals 106, the recording medium information can be inputted/outputted even if the tape cartridge is loaded in a conventional tape cartridge having the auxiliary storage medium carrying the contact point terminals. Also, since the system controller 146 executes transmission/reception of the recording medium information during loading and unloading of the magnetic tape 7, it is possible to shorten the operating time.

In the above-described recording and/or reproducing apparatus, the recording medium information can be inputted/outputted even if the tape cartridge loaded is such a one having the auxiliary storage medium carrying the contact point terminals. Alternatively, the recording and/or reproducing apparatus may be configured so that the transmission/reception of the recording medium information occurs exclusively over a radio path.

In this recording and/or reproducing apparatus in which the recording medium information is transmitted/received exclusively over the radio path, the contact point terminals 106 of the auxiliary recording and/or reproducing mechanism 101 may be dispensed with.

With the recording and/or reproducing apparatus 60, employing only the tape cartridge 1 adapted to transmit or receive the recording medium information solely over the radio path, the substantially L-shaped connector 102 is mounted on the base 103 for facing the back side of the loaded tape cartridge 1. Since there is no necessity in this case to provide contact point terminals on the recording and/or reproducing apparatus 60 which are protruded into the tape cartridge 1 into contact with the auxiliary storage medium 31 loaded in the tape cartridge 1, the connector 102 may be fixedly mounted on the base 103.

This connector 102 is provided with the wiring substrate 107 carrying an electrical circuit constituting the transmission/reception unit 108 for transmission/reception with the auxiliary storage medium 31 of the tape cartridge 1 over a radio path. This wiring substrate 107 is provided with a coil-shaped antenna 109 constituting a transmission/reception unit in association with the antenna 37 similarly constituting the transmission/reception unit provided on the auxiliary storage medium 31 of the tape cartridge 1. This antenna is provided facing the antenna 37 of the tape cartridge when the tape cartridge 1 is loaded in position.

In the above-described embodiment, the present invention is applied to a tape cartridge having housed therein a magnetic tape and a recording and/or reproducing apparatus employing this tape cartridge. The present invention may also be applied to a disc cartridge having housed therein a magnetic disc employing a flexible disc substrate or a disc cartridge having housed therein a hard disc employing a disc substrate formed of metal or tough material of a certain thickness and a recording and/or reproducing apparatus employing the disc cartridge as a recording medium. In addition, the present invention may be applied to a disc cartridge having housed therein an optical disc or a magneto-optical disc and to a recording and/or reproducing apparatus employing the disc cartridge as a recording medium with merits comparable to those obtained when using the above-mentioned tape cartridge.

Industrial Applicability

In the recording medium device according to the present invention, the auxiliary storage medium for inputting/outputting the recording medium information between it and the auxiliary recording and/or reproducing unit of the recording and/or reproducing apparatus is able to input or output the recording medium information in a non-contact fashion with the auxiliary recording and/or reproducing unit. The result is that the contact point terminals provided in the auxiliary storage medium may be prevented from being deteriorated due to repeated contact thereof with the contact point terminals of the auxiliary recording and/or reproducing unit of the recording and/or reproducing apparatus, in contrast from the conventional recording medium device having the auxiliary storage medium carrying the contact point terminals, to assure reliable inputting/outputting of the recording medium information.

Also, the recording and/or reproducing apparatus according to the present invention, in which the auxiliary recording and/or reproducing mechanism has a transmission/reception unit for inputting/outputting the recording medium information in a non-contact fashion with the auxiliary storage medium of the recording medium device and contact point terminals contacting with the contact point terminals of the conventional recording medium device, can be used with both the recording medium device having the wireless type auxiliary storage medium and the recording medium device having the contact type auxiliary storage medium.

What is claimed is:

1. A recording medium device, comprising:
    a main cartridge body unit for housing therein a magnetic tape recording medium that is coiled across a pair of tape reels and upon which are recorded information signals; and
    an auxiliary storage medium having a storage unit in which to store recording medium information concerning the recording medium and a transmission/reception unit for inputting the recording medium information from and outputting the recording medium information to a recording and reproducing apparatus in a non-contact fashion, wherein
    the storage unit and the transmission/reception unit are arranged on a same substrate;
    the auxiliary storage medium is arranged in the main cartridge body unit so that the transmission/reception unit of the substrate carrying the storage unit along with the transmission/reception unit is exposed to an exterior through an opening provided in at least one lateral surface excluding a front surface operating as an intruding end of the main cartridge body unit into an inside of the recording and reproducing apparatus;
    the transmission/reception unit includes a protection circuit, amplifiers, a control circuit, a memory, a modulator, a rectifier circuit, and an antenna for inputting the recording medium information to and outputting the recording medium information from the recording and reproducing apparatus;
    the auxiliary storage medium is operated by driving signals supplied from the transmission/reception unit provided on the recording and reproducing apparatus; and
    the auxiliary storage medium is loadable in the main cartridge body unit such that it is positioned corresponding to a position of a contact type auxiliary storage medium that performs transmission and reception via auxiliary recording medium contact point terminals in contact with recording and reproducing apparatus contact point terminals located in the recording and reproducing apparatus.

2. An auxiliary storage medium, comprising:

a storage unit in which recording medium information concerning a recording medium housed in a main cartridge body unit of a recording medium device is stored; and a transmission/reception unit having an antenna for inputting the recording medium information to and outputting the recording medium information from a recording and reproducing apparatus in a non-contact fashion, wherein the storage unit and the transmission/reception unit are arranged on a same substrate;

the auxiliary storage medium is loadable in the main cartridge body unit such that it is positioned corresponding to a position of a contact type auxiliary storage medium that performs transmission and reception via auxiliary storage medium contact point terminals in contact with recording and reproducing apparatus contact point terminals located in the recording and reproducing apparatus; and the auxiliary storage medium is formed in substantially a same outer shape as the contact type auxiliary storage medium.

3. An auxiliary storage medium, comprising:

a first auxiliary substrate having a storage unit; a second auxiliary substrate carrying a primary coil constituting a transmission/reception unit; a third auxiliary substrate carrying a secondary coil constituting the transmission/reception unit in cooperation with the primary coil; a fourth auxiliary substrate carrying a protective terminal contacted with contact point terminals provided on a recording and reproducing apparatus for protecting the contact point terminals, wherein the first, second, and third auxiliary substrates are layered and unified;

the auxiliary storage medium is loadable in a main cartridge body unit such that it is positioned corresponding to a position of a contact type auxiliary storage medium that performs transmission and reception via auxiliary storage medium contact point terminals in contact with the recording and reproducing apparatus contact point terminals located in the recording and reproducing apparatus; and the auxiliary storage medium is formed in substantially a same outer shape as the contact type auxiliary storage medium.

4. A recording and reproducing apparatus comprising:

a loading unit on which is loaded a recording medium device;

a recording and reproducing unit of r recording and reproducing a recording medium when the recording medium device is loaded on the loading unit;

a transmission/reception unit for performing non-contact inputting and outputting of recording medium information with an auxiliary storage medium having stored therein recording medium information concerning the recording medium of the recording medium device;

an auxiliary recording and reproducing unit arranged facing the auxiliary storage medium when the recording medium device is loaded on the loading unit; and contact point terminals for contacting contact point terminals provided on the auxiliary storage medium of an other recording medium device, wherein the auxiliary recording and reproducing unit includes a transmission/reception unit for effecting transmission/reception of the recording medium information with the auxiliary storage medium and for furnishing a driving signal for driving the auxiliary storage medium; and the transmission/reception unit effects the inputting/outputting of the recording medium information with the auxiliary storage medium during a loading operation of the recording medium.

* * * * *